US012621471B2

(12) United States Patent　　　(10) Patent No.:　US 12,621,471 B2
Hollmann et al.　　　　　　　　　(45) Date of Patent:　　　May 5, 2026

(54) METHOD TO DETERMINE ENCODER PARAMETERS

(71) Applicant: Telefonaktiebolaget LM Ericsson (publ), Stockholm (SE)

(72) Inventors: Christopher Hollmann, Uppsala (SE); Per Wennersten, Årsta (SE); Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 98 days.

(21) Appl. No.: 18/286,637

(22) PCT Filed: Apr. 8, 2022

(86) PCT No.: PCT/SE2022/050355
§ 371 (c)(1),
(2) Date: Oct. 12, 2023

(87) PCT Pub. No.: WO2022/220723
PCT Pub. Date: Oct. 20, 2022

(65) Prior Publication Data
US 2024/0195994 A1　　　Jun. 13, 2024

Related U.S. Application Data

(60) Provisional application No. 63/175,220, filed on Apr. 15, 2021.

(51) Int. Cl.
*H04N 19/196*　　　(2014.01)
*H04N 19/146*　　　(2014.01)
*H04N 19/154*　　　(2014.01)

(52) U.S. Cl.
CPC ......... *H04N 19/196* (2014.11); *H04N 19/146* (2014.11); *H04N 19/154* (2014.11)

(58) Field of Classification Search
CPC .. H04N 19/196; H04N 19/146; H04N 19/154; H04N 19/147; H04N 19/172;
(Continued)

(56) References Cited

U.S. PATENT DOCUMENTS 11,297,027 B1 *　4/2022　Agrawal ............. H04L 65/1069
2016/0173882 A1　6/2016　Mishra et al.
(Continued)

FOREIGN PATENT DOCUMENTS

CN　　107454413 A　12/2017
CN　　113366531 A　9/2021
(Continued)

OTHER PUBLICATIONS

International Search Report and Written Opinion of the International Searching Authority, PCT/SE2022/050355, mailed May 12, 2022, 13 pages.
(Continued)

*Primary Examiner* — Tracy Y. Li
(74) *Attorney, Agent, or Firm* — Sage Patent Group

(57)　　　　　　ABSTRACT

A method performed by an apparatus to determine compression parameters to choose when compressing images or videos for use in a machine vision task is provided. The method includes compressing an uncompressed original image or video at a plurality of different quality levels and/or bit rates to create a plurality of compressed images or videos. The method further includes, for each compressed image or video compressed at the different quality levels and/or bit rates: decompressing the compressed image or video to create a decompressed image or video, executing a machine vision algorithm on the decompressed image or video to generate machine vision results for the decompressed image or video and deriving a performance value indicating a performance of the decompressed image or
(Continued)

video based on comparing the machine vision results to an assumed truth.

12 Claims, 11 Drawing Sheets

(58) Field of Classification Search
CPC .. H04N 19/103; G06V 10/255; G06V 10/776; G06V 10/993
See application file for complete search history.

(56) References Cited

U.S. PATENT DOCUMENTS

| | | | |
|---|---|---|---|
| 2018/0367799 A1 | 12/2018 | Carmel et al. | |
| 2022/0116627 A1 | 4/2022 | Liu et al. | |
| 2022/0201321 A1* | 6/2022 | Gao | H04N 19/117 |
| 2023/0087657 A1* | 3/2023 | Chen | G06V 10/993 |
| | | | 382/118 |
| 2023/0262243 A1* | 8/2023 | Ikonin | H04N 19/60 |
| | | | 382/239 |

FOREIGN PATENT DOCUMENTS

| | | | | |
|---|---|---|---|---|
| WO | WO-2022154686 A1 * | 7/2022 | | G06T 9/00 |
| WO | WO-2022155974 A1 * | 7/2022 | | H04N 19/124 |
| WO | WO-2022211658 A1 * | 10/2022 | | G06N 3/04 |

OTHER PUBLICATIONS

Sharma, Urvashi et al., "A Block Adaptive Near-Lossless Compression Algorithm for Medical Image Sequences and Diagnostic Quality Assessment," Journal of Digital Imaging, 2020, vol. 33, 15 pages.

Zhou, Mingliang et al., "Global Rate-Distortion Optimization-Based Rate Control for HEVC HDR Coding," IEEE Transactions on Circuits and Systems for Video Technology, vol. 30, No. 12, Dec. 2020, 15 pages.

Silvestre Blanes, Javier et al., "Machine Vision in Profibus Networks," Emerging Technologies and Factory Automation, 2001; Proceedings, 8th IEEE International Conference, Oct. 15-18, 2001, 9 pages.

Wang, Shurun et al., "End-to-End Compression Towards Machine Vision: Network Architecture Design and Optimization," Digital Object Identifier 10.1109/OJCAS.2021.3126061, 11 pages.

Zhang, Qi et al., "Just Recognizable Distortion for Machine Vision Oriented Image and Video Coding, " International Journal of Computer Vision, 2021, vol. 129, 18 pages.

Yan, Ning et al., "SSSIC: Semantics-to-Signal Scalable Image Coding With Learned Structural Representations," IEEE Transactions on Image Processing, vol. 30, 2021, 16 pages.

ISO/IEC JTC 1/SC 29/WG 2 N42, MPEG Technical Requirements, Convenorship: SFS (Finland), "Call for Evidence for Video Coding for Machines, " MPEG WG2-N00042), Online, Jan. 2021, 12 pages.

Extended European Search Report, European Patent Application No. 22788540.7, mailed Aug. 20, 2024, 12 pages.

Yang, S., et al., "Towards Coding for Human and Machine Vision: Scalable Face Image Coding," IEEE Transactions on Multimedia, vol. 30680580, No. 1, Jan. 1, 2021, pp. 1-1, XP055839437, 15 pages.

Duan, L., et al., "Video Coding for Machines: A Paradigm of Collaborative Compression and Intelligent Analytics," IEEE Transactions on Image Processing, IEEE, USA, vol. 29, Aug. 28, 2020, pp. 8680-8695, XP011807613, 15 pages.

Xia S., et al., "An Emerging Coding Paradigm Vcm: A Scalable Coding Approach Beyond Feature And Signal," 2020 IEEE International Conference On Multimedia And Expo (ICME), IEEE, Jul. 6, 2020, pp. 1-6, XP033808232, 6 pages.

Hu, Y., et al., "Towards Coding For Human and Machine Vision: A Scalable Image Coding Approach," 2020 IEEE International Conference On Multimedia And Expo (ICME), IEEE, Jul. 6, 2020, pp. 1-6, XP033808142, 6 pages.

Athar, S., et al., "A Comprehensive Performance Evaluation of Image Quality Assessment Algorithms," IEEE Access, vol. 7, Sep. 24, 2019, pp. 140030-140070, XP011749550, 41 pages.

* cited by examiner

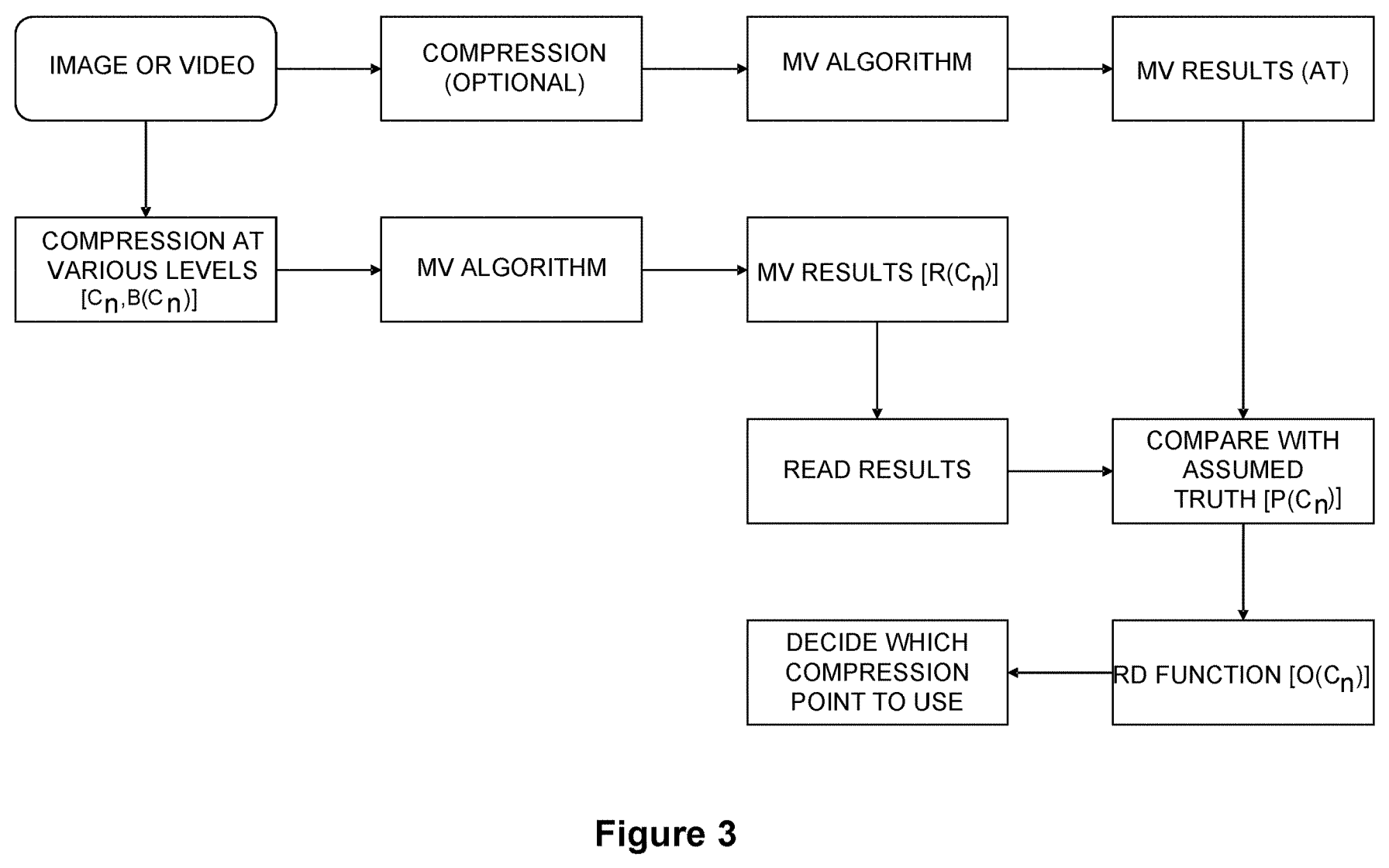

IMAGE OR VIDEO

COMPRESSION (OPTIONAL)

MV ALGORITHM

MV RESULTS (AT)

COMPRESSION AT VARIOUS LEVELS [$C_n$, B($C_n$)]

MV ALGORITHM

MV RESULTS [R($C_n$)]

READ RESULTS

COMPARE WITH ASSUMED TRUTH [P($C_n$)]

RD FUNCTION [O($C_n$)]

DECIDE WHICH COMPRESSION POINT TO USE

Figure 3

STEP FUNCTION DISPLACED AT X=0.7

SIGMOID FUNCTION WITH B=30 AT 0.7

CONTRIBUTION R AS A SMOOTH FUNCTION OF OVERLAP OL

P($C_n$) AS A FUNCTION OF RATIO OF CORRECTLY CLASSIFIED PIXELS

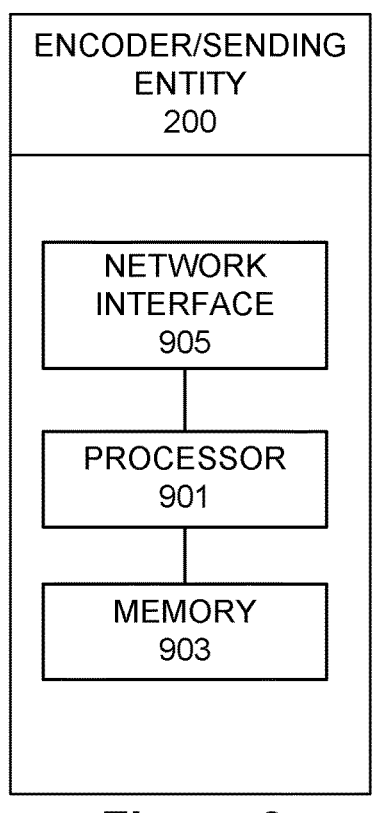

| ENCODER/SENDING ENTITY 200 |
|---|
| NETWORK INTERFACE 905 |
| PROCESSOR 901 |
| MEMORY 903 |

Figure 9

| DEVICE 210 |
|---|
| NETWORK INTERFACE 1005 |
| PROCESSOR 1001 |
| MEMORY 1003 |

| DECODER 206 | MACHINE VISION TASK 212 |

Figure 10

DETERMINING A BIT RATE TO USE BASED ON BITS SPENT ON COMPRESSING THE IMAGE OR VIDEO
1201

Figure 12

EXECUTING A RATE-DISTORTION FUNCTION TO SET A RATE-DISTORTION PERFORMANCE VALUE OF A COMPRESSION-DISTORTION TRADEOFF
1301

DETERMINING THE QUALITY LEVEL AND /OR BIT RATE TO USE IN THE MACHINE VISION TASK BASED FURTHER ON THE RATE-DISTORTION PERFORMANCE VALUE
1303

Figure 13

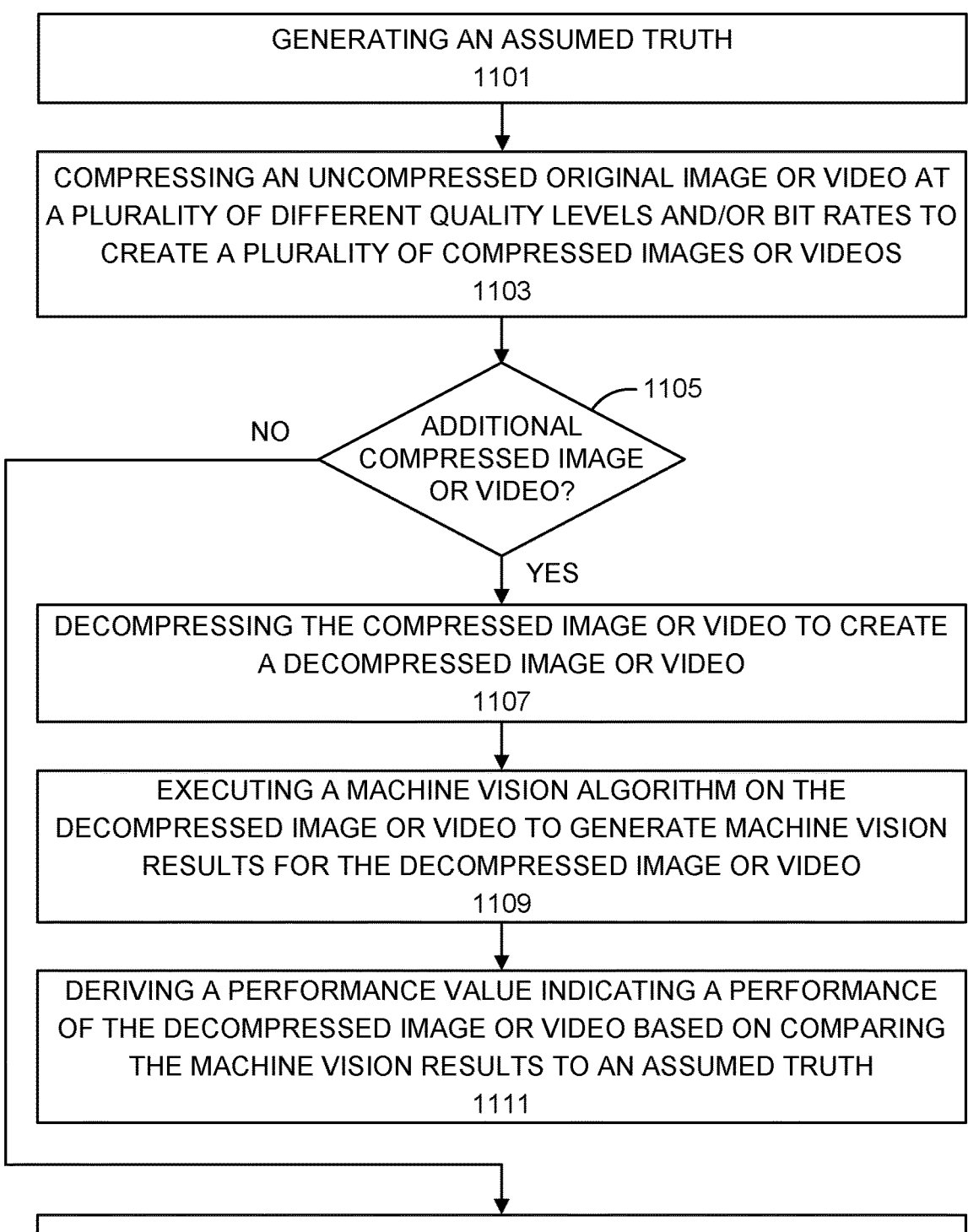

GENERATING AN ASSUMED TRUTH
1101

COMPRESSING AN UNCOMPRESSED ORIGINAL IMAGE OR VIDEO AT A PLURALITY OF DIFFERENT QUALITY LEVELS AND/OR BIT RATES TO CREATE A PLURALITY OF COMPRESSED IMAGES OR VIDEOS
1103

ADDITIONAL COMPRESSED IMAGE OR VIDEO?
1105

NO

YES

DECOMPRESSING THE COMPRESSED IMAGE OR VIDEO TO CREATE A DECOMPRESSED IMAGE OR VIDEO
1107

EXECUTING A MACHINE VISION ALGORITHM ON THE DECOMPRESSED IMAGE OR VIDEO TO GENERATE MACHINE VISION RESULTS FOR THE DECOMPRESSED IMAGE OR VIDEO
1109

DERIVING A PERFORMANCE VALUE INDICATING A PERFORMANCE OF THE DECOMPRESSED IMAGE OR VIDEO BASED ON COMPARING THE MACHINE VISION RESULTS TO AN ASSUMED TRUTH
1111

DETERMINING A QUALITY LEVEL AND/OR BIT RATE TO USE IN THE MACHINE VISION TASK BASED ON THE PERFORMANCE VALUE FOR EACH DECOMPRESSED IMAGE OR VIDEO COMPRESSED AT THE DIFFERENT QUALITY LEVELS AND/OR BIT RATES
1113

Figure 11

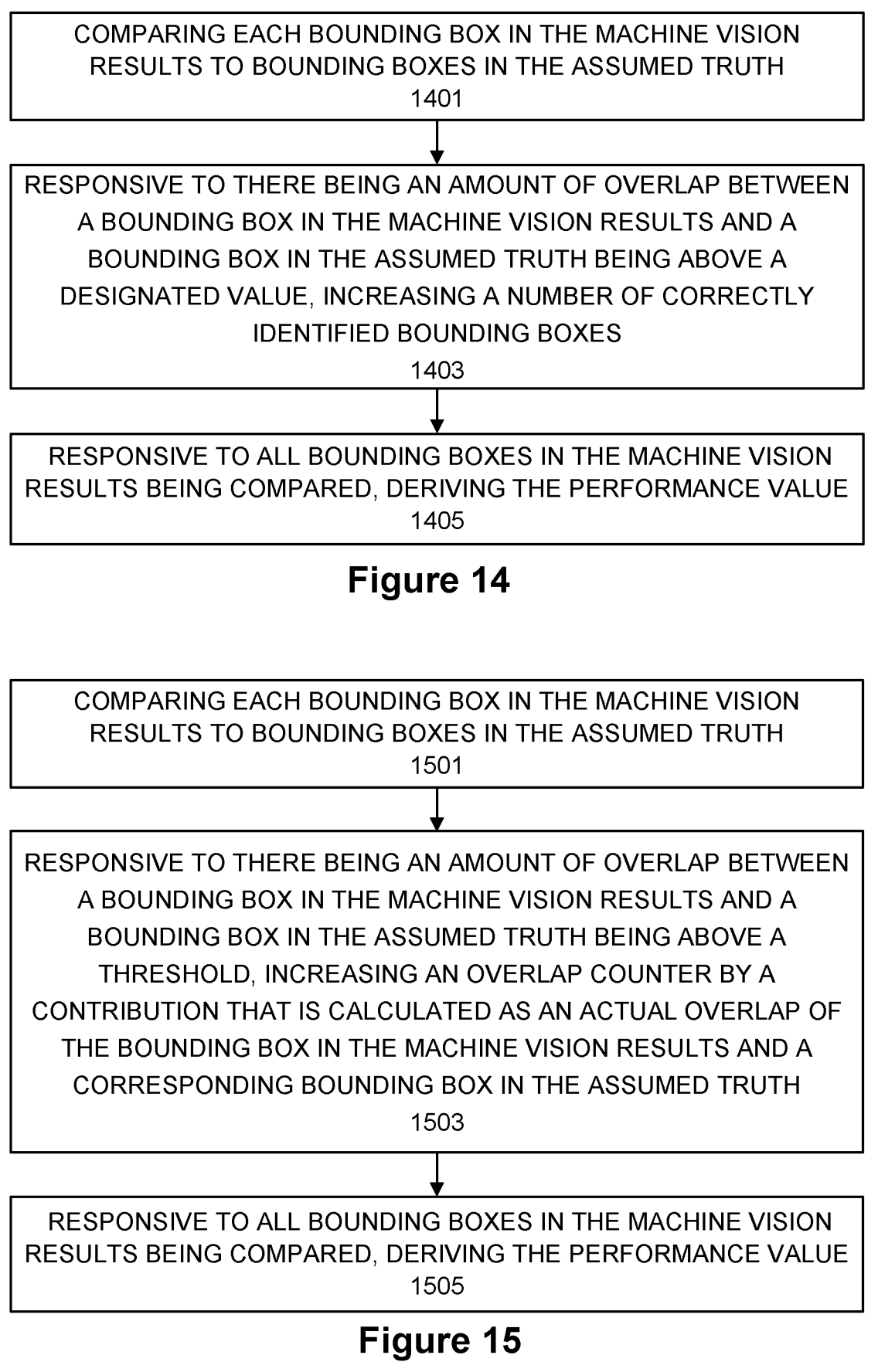

COMPARING EACH BOUNDING BOX IN THE MACHINE VISION
RESULTS TO BOUNDING BOXES IN THE ASSUMED TRUTH
1401

RESPONSIVE TO THERE BEING AN AMOUNT OF OVERLAP BETWEEN
A BOUNDING BOX IN THE MACHINE VISION RESULTS AND A
BOUNDING BOX IN THE ASSUMED TRUTH BEING ABOVE A
DESIGNATED VALUE, INCREASING A NUMBER OF CORRECTLY
IDENTIFIED BOUNDING BOXES
1403

RESPONSIVE TO ALL BOUNDING BOXES IN THE MACHINE VISION
RESULTS BEING COMPARED, DERIVING THE PERFORMANCE VALUE
1405

Figure 14

COMPARING EACH BOUNDING BOX IN THE MACHINE VISION
RESULTS TO BOUNDING BOXES IN THE ASSUMED TRUTH
1501

RESPONSIVE TO THERE BEING AN AMOUNT OF OVERLAP BETWEEN
A BOUNDING BOX IN THE MACHINE VISION RESULTS AND A
BOUNDING BOX IN THE ASSUMED TRUTH BEING ABOVE A
THRESHOLD, INCREASING AN OVERLAP COUNTER BY A
CONTRIBUTION THAT IS CALCULATED AS AN ACTUAL OVERLAP OF
THE BOUNDING BOX IN THE MACHINE VISION RESULTS AND A
CORRESPONDING BOUNDING BOX IN THE ASSUMED TRUTH
1503

RESPONSIVE TO ALL BOUNDING BOXES IN THE MACHINE VISION
RESULTS BEING COMPARED, DERIVING THE PERFORMANCE VALUE
1505

Figure 15

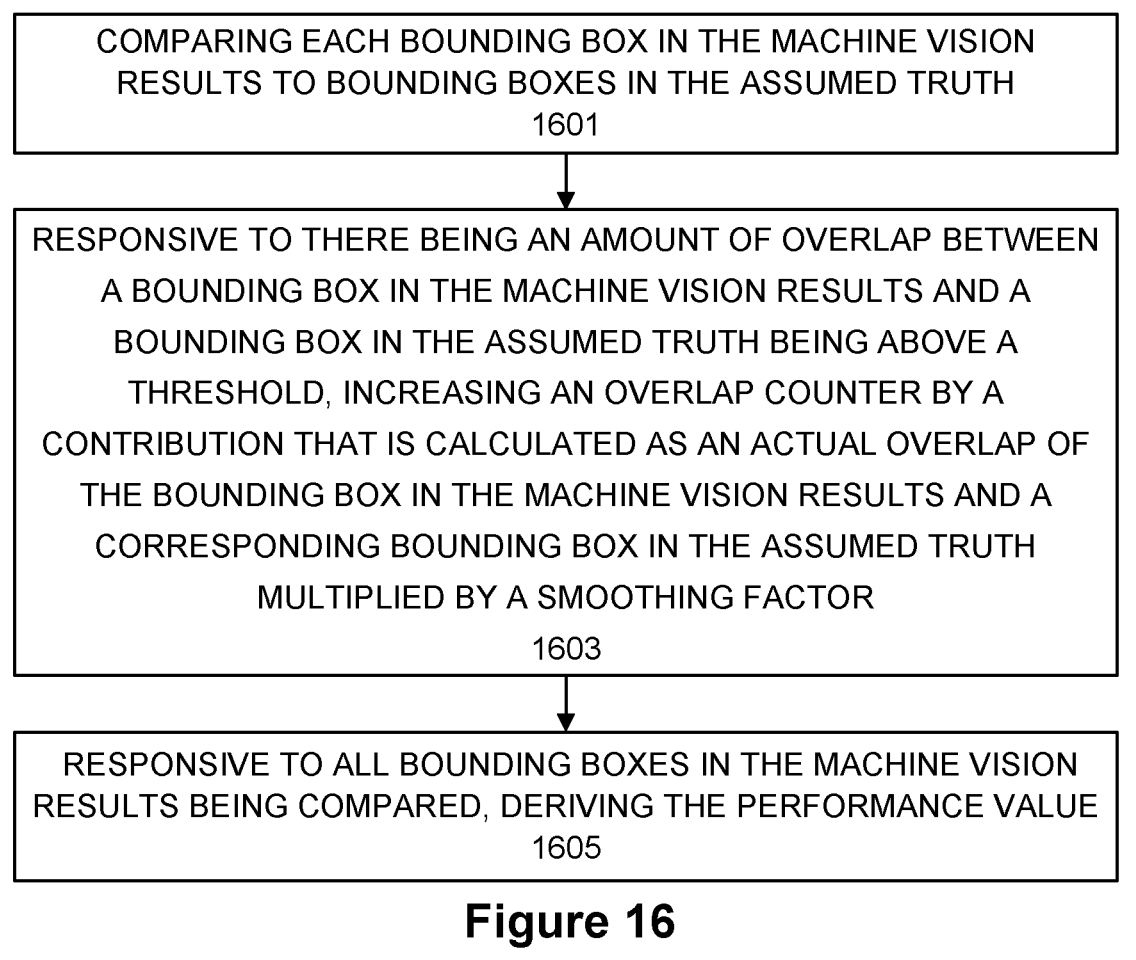

COMPARING EACH BOUNDING BOX IN THE MACHINE VISION RESULTS TO BOUNDING BOXES IN THE ASSUMED TRUTH
1601

RESPONSIVE TO THERE BEING AN AMOUNT OF OVERLAP BETWEEN A BOUNDING BOX IN THE MACHINE VISION RESULTS AND A BOUNDING BOX IN THE ASSUMED TRUTH BEING ABOVE A THRESHOLD, INCREASING AN OVERLAP COUNTER BY A CONTRIBUTION THAT IS CALCULATED AS AN ACTUAL OVERLAP OF THE BOUNDING BOX IN THE MACHINE VISION RESULTS AND A CORRESPONDING BOUNDING BOX IN THE ASSUMED TRUTH MULTIPLIED BY A SMOOTHING FACTOR
1603

RESPONSIVE TO ALL BOUNDING BOXES IN THE MACHINE VISION RESULTS BEING COMPARED, DERIVING THE PERFORMANCE VALUE
1605

Figure 16

METHOD TO DETERMINE ENCODER PARAMETERS

CROSS REFERENCE TO RELATED APPLICATIONS

This application is a 35 U.S.C. § 371 national stage application of PCT International Application No. PCT/SE2022/050355 filed on Apr. 8, 2022, which in turn claims domestic priority to U.S. Provisional Patent Application No. 63/175,220, filed on Apr. 15, 2021, the disclosures and content of which are incorporated by reference herein in their entirety.

TECHNICAL FIELD

The present disclosure relates generally to communications, and more particularly to encoding and decoding methods and related devices and nodes supporting encoding and decoding.

BACKGROUND

Many of the image and video compression standards that have been developed over the last years have primarily been directed at human viewers. The impression of how a human that views a decoded video has thus been the focus of many efforts.

However, due to the recent increase in computational capabilities and the rise of neural networks, another category of "viewers" for visual content has emerged—machines. Computers or algorithms analyze videos and make decisions based on what the machines are seeing. There are many different machine vision (MV) tasks that machines can perform, such as object detection, tracking or segmentation, action recognition, pose estimation, event prediction and many more.

One of the most common tasks a machine performs is object detection, where an algorithm (e.g. a neural network) searches for objects within a video or image and generally returns a bounding box indicating the position of the object and a label indicating what kind of object it is.

There are a number of datasets to train and test neural networks that perform MV tasks available. These datasets usually consist of several components:

A large training set, that can be used for training the algorithm

A small verification set, for which results with specified algorithms are published, so users can verify that their setup is working correctly.

A test set which is often used in challenges

The ground truth (GT), which contains the correct answers for the tasks that are evaluated.

Taking object detection as an example, FIG. 1 shows a bounding box from the GT and a detected bounding box. Here the area of the intersection (solid line) is divided by the area of the union (dashed line) of the two bounding boxes. If this value, usually called the intersection over union (IoU), exceeds a predetermined threshold (e.g., 0.5), the bounding box is considered detected successfully. In the following paragraphs, the IoU is referred to as overlap.

In 2019, the International Standardization Organization's Moving Pictures Expert Group (MPEG) started an investigation into the area of video coding for machines. Here the goal is to either develop a new compression standard or find a different solution that can optimize video compression for MV tasks.

SUMMARY

The current methods to compress images or videos use primarily the same encoder parameters for entire datasets with little to no variation. In most cases there is no consideration of the performance for certain machine vision tasks on a per-image or per-video basis.

According to a first aspect of the present disclosure, there is provided a method performed by an apparatus to determine compression parameters to choose when compressing images or videos for use in a machine vision task. The method comprises compressing an uncompressed original image or video at a plurality of different quality levels and/or bit rates to create a plurality of compressed images or videos. The method further comprises, for each compressed image or video compressed at the different quality levels and/or bit rates: decompressing the compressed image or video to create a decompressed image or video, executing a machine vision algorithm on the decompressed image or video to generate machine vision results for the decompressed image or video and deriving a performance value indicating a performance of the decompressed image or video based on comparing the machine vision results to an assumed truth. The method comprises determining a quality level and/or bit rate to use in the machine vision task based on the performance value for each decompressed image or video compressed at the different quality levels and/or bit rates.

According to a second aspect of the present disclosure, there is provided an apparatus adapted to perform the method according to the first aspect.

According to a third aspect of the present disclosure, there is provided a computer program comprising program code to be executed by processing circuitry of an apparatus, whereby execution of the program code causes the apparatus to perform the method according to the first aspect.

According to a fourth aspect of the present disclosure, there is provided a computer program product comprising a non-transitory storage medium including program code to be executed by processing circuitry of an apparatus, whereby execution of the program code causes the apparatus to perform the method according to the first aspect.

Advantages that can be achieved enable a video compression algorithm to be more efficient and spend bits on videos or parts of a video that are more relevant for machine vision tasks.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 3 is a flowchart illustrating some operations an apparatus performs to determine compression parameters to use when compressing images or videos for use in a machine vision task according to some embodiments of inventive concepts;

FIG. 9 is a block diagram illustrating an encoder/sending entity according to some embodiments of inventive concepts;

FIG. 10 is a block diagram illustrating a device having a decoder and machine task according to some embodiments of inventive concepts;

FIGS. 11-16 are flow chart illustrating operations of an encoder/sending entity or a device having a decoder and machine task according to some embodiments of inventive concepts;

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Note on video vs image: In the description that follows, the term video may be used exclusively in some parts of the description. A video is considered a sequence of images where the number of images varies from video to video. The algorithms described herein works identically on images, as a stand-alone image can be seen as a video with only one image.

As previously indicated, the current methods to compress images or videos use primarily the same encoder parameters for entire datasets with little to no variation. In most cases there is no consideration of the performance for certain machine vision tasks on a per-image or per-video basis.

Various embodiments of inventive concepts determine which compression parameters to choose when compressing images or videos for machine vision task uses like object detection, tracking, segmentation, or similar machine vision tasks. An algorithm uses a rate-distortion function to compare the performance of the machine vision task for different version of the same image that has been compressed using different parameters and afterwards decompressed. This function can then be adjusted to put more focus on maintaining a high performance or reducing the bit rate. For example, various embodiments of inventive concepts optimize an existing video compression algorithm to compress videos while minimizing the impact on the performance of a machine vision task.

Figure 2:
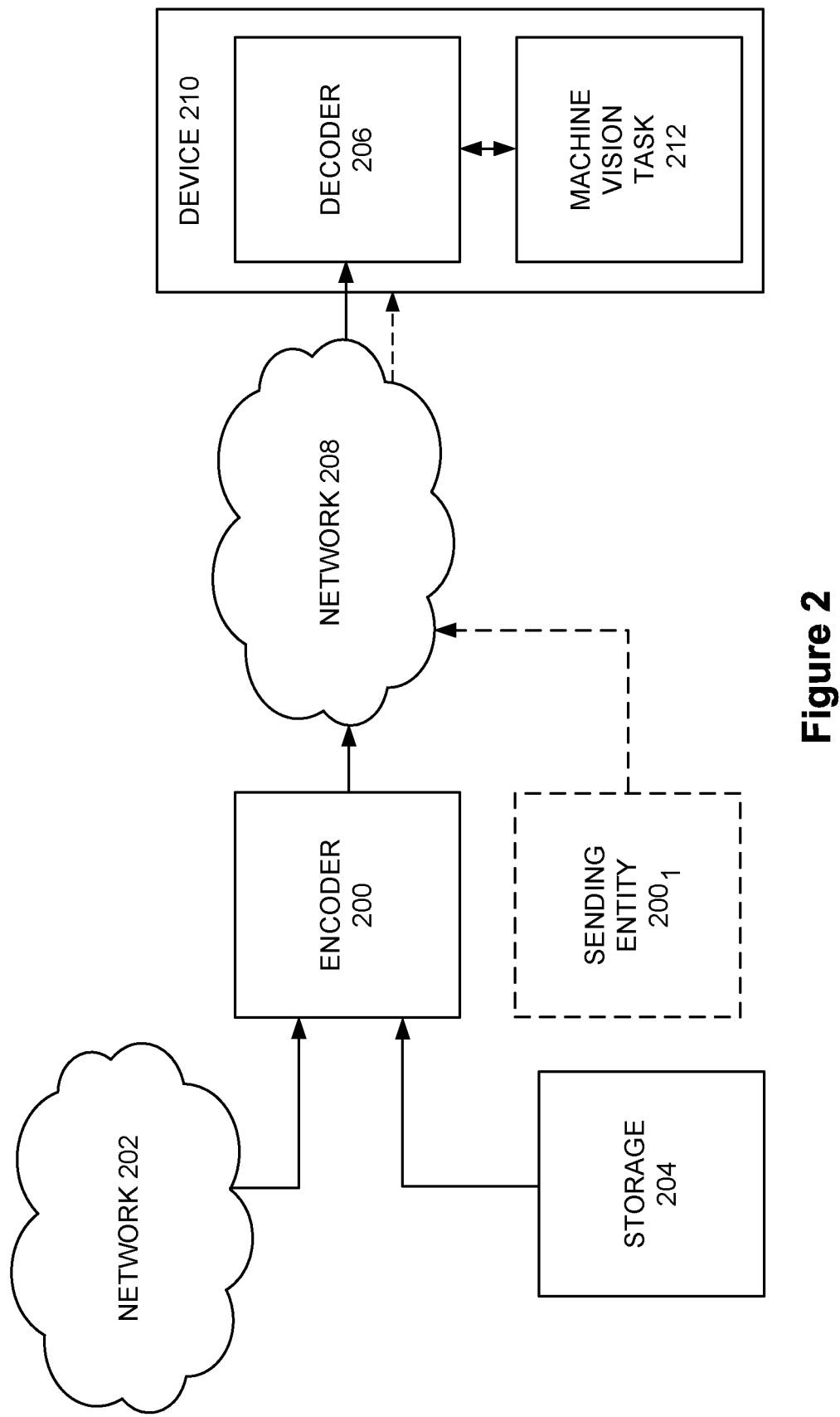
FIG. 2 is a block diagram illustrating an example of an environment of a system in which and encoder and device having a decoder may be implemented according to some embodiments of inventive concepts.

Prior to describing the various embodiments of inventive concepts in further detail, FIG. 2 illustrates an example of an operating environment of an encoder 200 and device 210 having a decoder 206 and machine vision task 212 that may be used to respectively encode and decode images or videos for machine vision tasks as described herein. The encoder 200 receives images or videos from network 202 and/or from storage 204 and encodes the video as described below and transmits the encoded video to device 210 via network 208. The encoder 200 in some embodiments may be part of a sending entity $200_1$ that transmits the encoded image or video for a machine vision task. Storage device 204 may be part of a storage depository such as a storage repository of a store or a streaming video service, a separate storage component, a component of a mobile device, etc. The device 210 may be a mobile device controlling a machine vision task 212, an apparatus that is part of a machine vision task, and the like.

Turning to FIG. 3, some of the steps performed by the device determining which compression parameters to choose should be completed in advance of the deciding which parameters to use. In the description that follows, an overall description of the steps performed will be first described.

In the first step, the assumed truth (AT) is generated. Note that in some embodiments, the image or video can be compressed. However, it works fine to generate the AT on the uncompressed original image or video. If compression is applied, the image or video is decompressed afterwards. The machine vision algorithm is executed on the decompressed (if compressed) or the original image or video and the output is generated. Different MV algorithms produce different forms of output.

In the second step, the image or video is compressed at different quality levels or bit rates. This can for example be achieved by changing the resolution of the image or video (both spatial and temporal), using a different quantization parameter, using different quantization parameters for different parts of the image or video, turning off certain parts of the encoding algorithm or even using a different compression algorithm.

The bit rate $B(C_n)$ is determined based on the bits spent on the compressed image or video. This can be measured in different ways, for example using bits per pixel (BPP), kilobits per second (kbps) or total bits spent on the image or video.

The compressed video is then decompressed and fed into the MV algorithm, producing once again the MV results. Each compression point $C_n$ has a set of results $R(C_n)$ associated with it.

In the third step, the performance $P(C_n)$ at each compression point is determined by comparing the results $R(C_n)$ with the AT.

In the fourth step, a rate-distortion function is used to set a value $O(C_n)$ on the compression-distortion trade-off. The function can be executed in accordance with $$O(C_n)=B(C_n)^{i}*\lambda+P(C_n)^{j}$$

where $O(C_n)$ is the rate-distortion value, $B(C_n)$ is the bit rate, $P(C_n)$ is the performance value, $\lambda$ is a weighting parameter and "i" and "j" are parameters. The above function can be rewritten as four functions where just one of the four functions can be executed. These four functions can be written as:

$$O(C_n)=B(C_n)*\lambda+P(C_n)$$

$$O(C_n)=B(C_n)*\lambda+P(C_n)^{j}$$

$$O(C_n)=B(C_n)^{i}*\lambda+P(C_n)$$

$$O(C_n)=B(C_n)^{i}*\lambda+P(C_n)^{j}$$

One way of finding the best performance of all $C_n$ is to take the minimum of all $O(C_n)$.

Now that the overall description of the steps performed have been describes an example will now be discussed where the machine vision task is object detection.

In step 1, the results generated for the AT are a list of bounding boxes that describe each object. Here the algorithm gives a score for each object, indicating how certain it is that the found bounding box represents an object of the described class. This score usually ranges from 0 (very unsure) to 1 (totally sure).

The results are filtered based on this score to create the assumed truth. For example, the results can be filtered using a threshold $T_{opt}$ so that only objects where the algorithm has assigned a score of $T_{opt}$ or higher are included. Setting $T_{opt}$ to 0 would be the equivalent of not filtering the results and using all found bounding boxes in the AT whereas setting $T_{opt}$ to 0.9 would require a very high certainty about the content of a bounding box to include it in the assumed truth.

Step 2: As the compression is independent of the MV task, the processing does not change. The MV results $R(C_n)$ of each compression point at the different quality levels or bit rates contain a list of bounding boxes.

Step 3: For each compression point $C_n$, a value $P(C_n)$ indicating the performance of $C_n$ is calculated. There are several ways to determine this value In a first way of embodiments of inventive concepts, each bounding box in $R(C_n)$ is compared to the bounding boxes in AT. If there is a sufficient overlap between a bounding box in $R(C_n)$ and a bounding box in AT, the number of correctly identified bounding boxes is increased. Once all bounding boxes have been compared, $P(C_n)$ is determined by subtracting the number of correctly identified bounding boxes #corr from the number of bounding boxes in AT #num. This way, $P(C_n)$=#num−#corr. In this case, a low value for $P(C_n)$ is better than a high value, as a low value indicates that more bounding boxes have been correctly identified. An alternative can also be to divide this difference by the total number of correct bounding boxes to obtain a ratio (#num−#corr)/#num, and this ratio is used as $P(C_n)$. In this case, $P(C_n)$ is set to 0 if #num=0 in order to avoid a division by zero.

In a second way of embodiments of inventive concepts, an alternative of the first way is to not count the number of correctly identified bounding boxes, but rather determine how much overlap there is between the bounding boxes in $R(C_n)$ and AT. Here for each correctly identified bounding box (i.e., the overlap is above a threshold $T_O$) an overlap counter OC is increased by a contribution R which is calculated as the actual overlap OL of the bounding box in $R(C_n)$ and the corresponding bounding box in AT. As an example, if the threshold $T_O$ is 0.7 and the actual overlap OL is 0.8, then the OC is increased by R=0.8. If the actual overlap is instead 0.6, the OC is not increased, and the contribution R=0. Once all bounding boxes have been compared, $P(C_n)$ is determined by subtracting the overlap counter OC from the number of bounding boxes #num in AT. In this case, a low value for $P(C_n)$=#num−OC is better than a high value, as a low value indicates that more bounding boxes have been correctly identified with a high overlap. An alternative is to determine $P(C_n)$ by dividing the OC by the number of bounding boxes #num in AT. This results in P(Cn) being a ratio between 0 and 1, indicating what share of the bounding boxes in AT have been found. If P(Cn) equals 1 all bounding boxes in AT have been found, whereas 0 indicates that no bounding boxes have been correctly identified. P(Cn) can be set to zero if #num=0 to avoid division by zero.

In a third way of embodiments of inventive concepts, after determining the number of correctly identified bounding boxes in the same manner as described in the first way, this number is divided by the number of bounding boxes in AT. This results in P(Cn) being a ratio between 0 and 1, indicating what share of the bounding boxes in AT have been found. If P(Cn) equals 1 all bounding boxes in AT have been found, whereas 0 indicates that no bounding boxes have been correctly identified. Again, P(Cn) can be set to zero if #num=0 to avoid division by zero.

Figure 1:
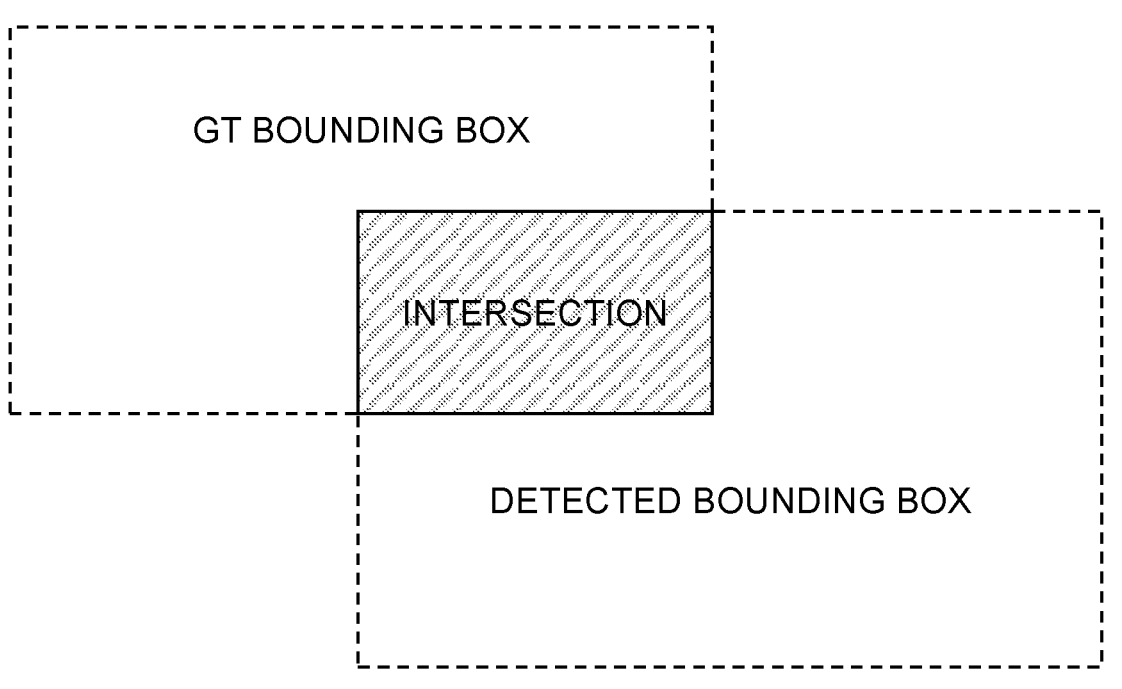
FIG. 1 is an illustration illustrating an intersection of a ground truth bounding box and a detected bounding box.
Figure 4:
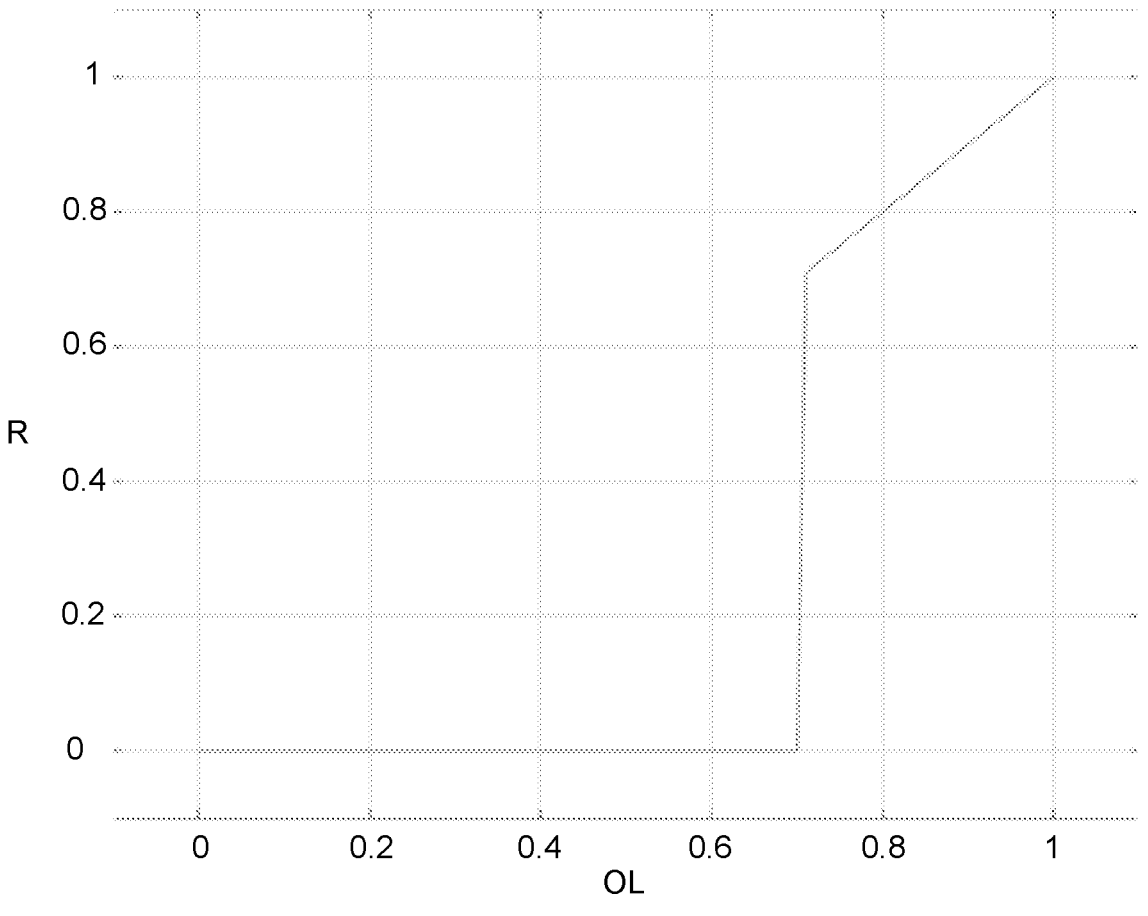
FIG. 4 is an illustration of a contribution plotted as a function of overlap according to some embodiments of inventive concepts.

In a fourth way of embodiments of inventive concepts, a drawback with the second way of embodiments of inventive concepts may be that there is a steep increase in the error $P(C_n)$ once the overlap passes the threshold. As an example, if the threshold is 0.7 and the overlap is 0.71, the OC is increased by 0.71 (i.e., the error, or loss function $P(C_n)$ is decreased by the same amount). However, if the overlap is instead 0.69 the OC is not increased at all since 0.69 is below the threshold and the bounding box is no longer regarded as being correctly identified. This is illustrated in FIG. 4 where the contribution R is plotted as a function of the overlap OL for the case when the threshold is equal to 0.7. This discontinuous jump in OC can cause inefficiencies.

Figure 5:
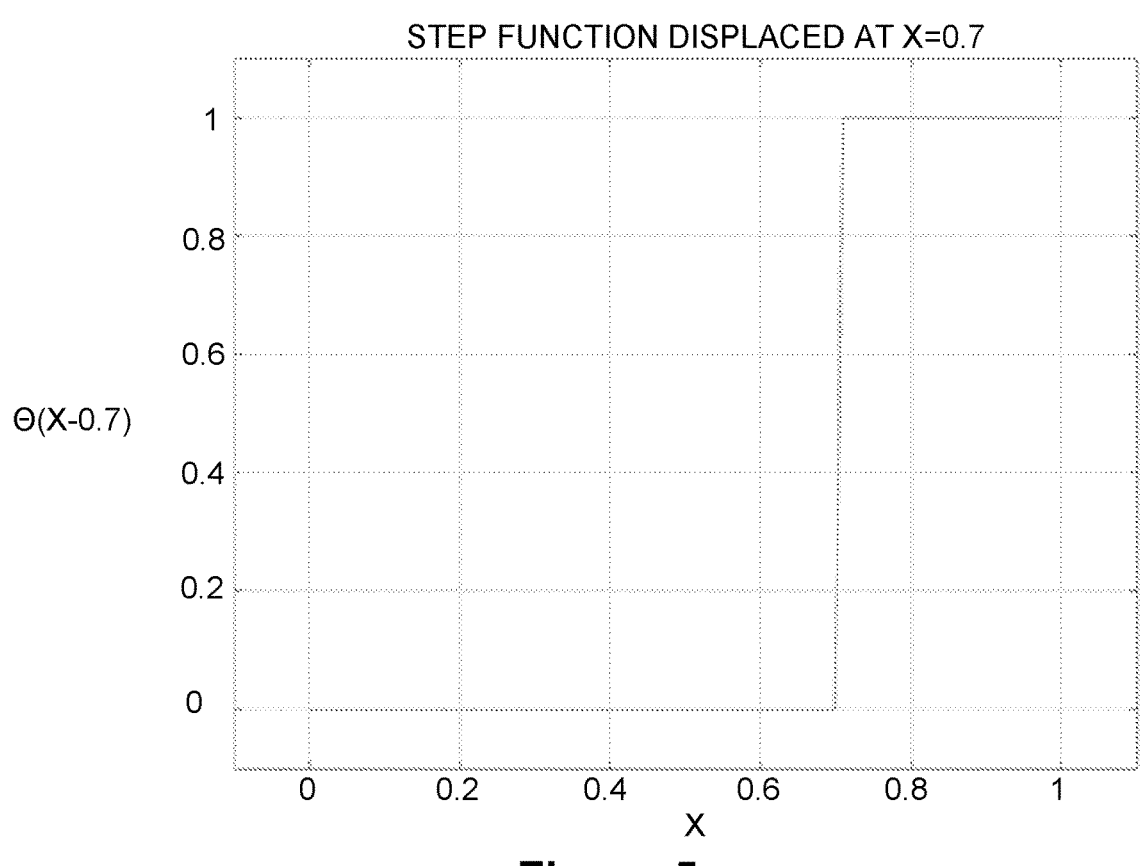
FIG. 5 is an illustration of a contribution plotted as the multiplication of the overlap and a step function according to some embodiments of inventive concepts.

This contribution R can be seen as the multiplication of the overlap OL and a step function $\theta(OL-0.7)$: $R(OL)=OL*\theta(OL-0.7)$, where the step function $\theta(x)=1$ if $x>=0$ and 0 otherwise. This is illustrated in FIG. 5.

Figure 6:
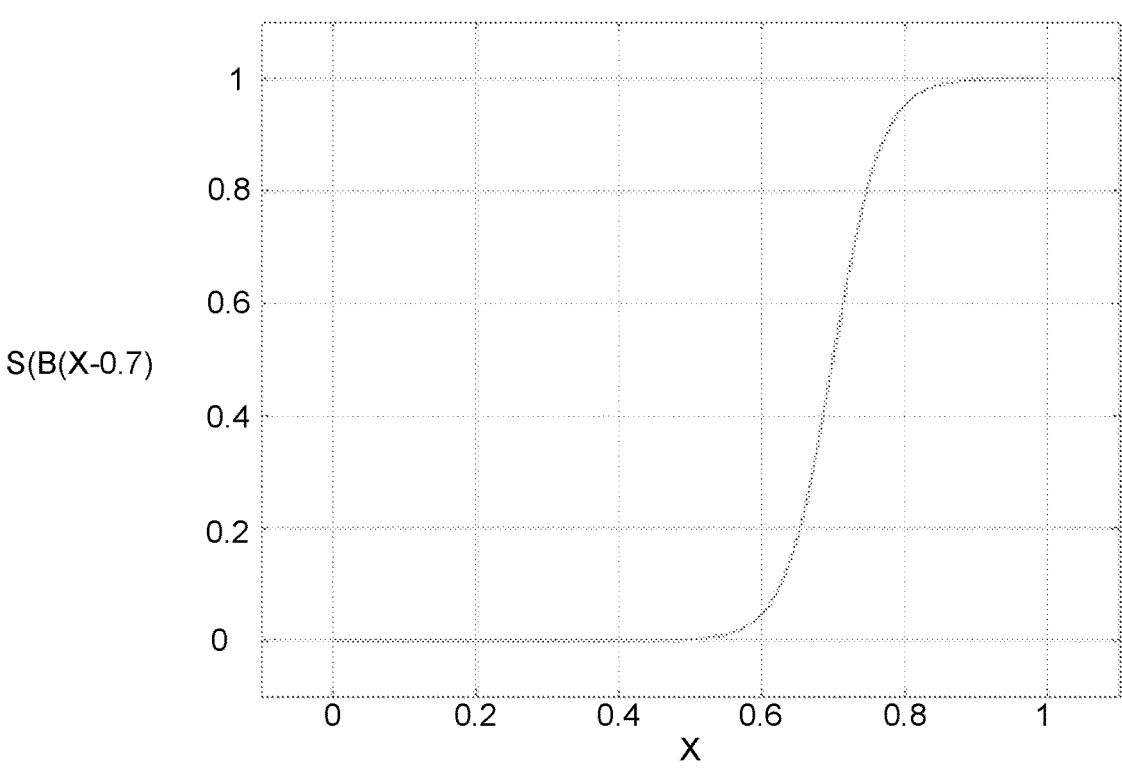
FIG. 6 is an illustration of a sigmoid function according to some embodiments.

By multiplying with something smoother than a step function it is possible to make the contribution depend more smoothly on OL. As an example, if we instead define R(OL) or $$R(OL) = OL * \frac{1}{1 + e^{-(b*(OL-0.7))}},$$

shorter $R(OL)=OL*S(b*(OL-0.7))$ where S(x) is a as sigmoid function $$S(x) = \frac{1}{1 + e^{-x}},$$

we can get a smoother contribution. FIG. 6 illustrates S(b(x−0.7)) for the case when b=30.

Figure 7:
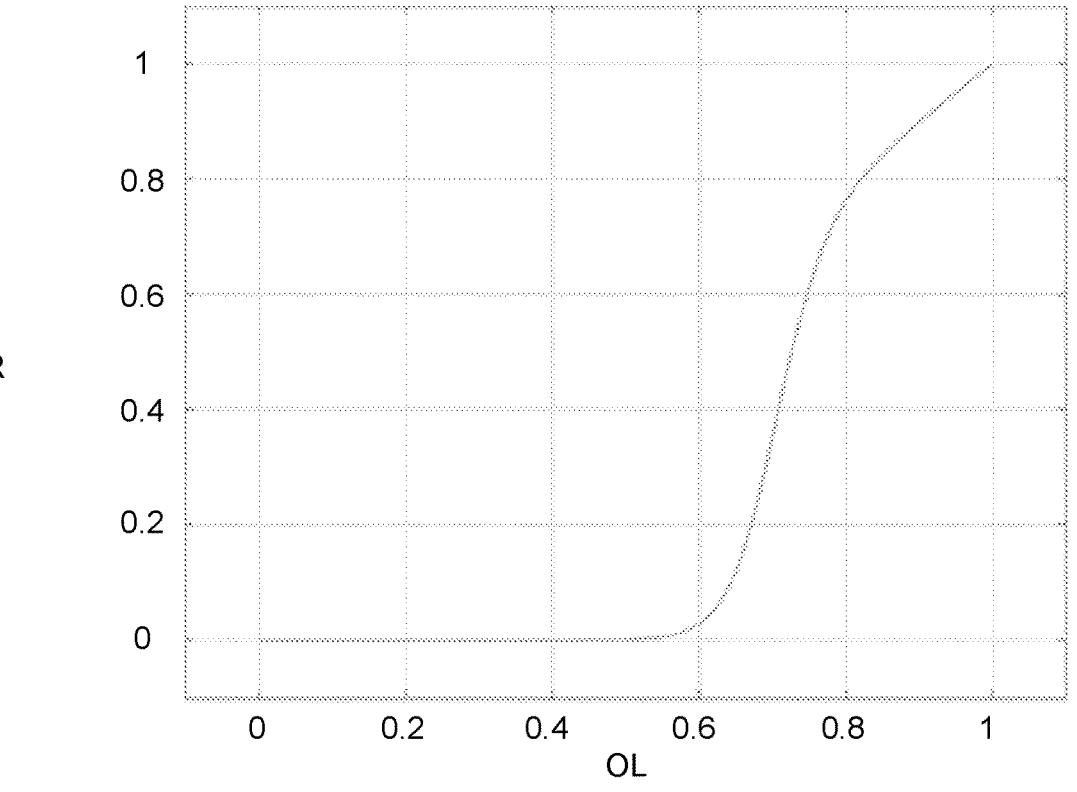
FIG. 7 is an illustration of a contribution plotted as a smooth function of the overlap according to some embodiments of inventive concepts.

Multiplying the curve shown in FIG. 6 with the overlap OL gives the contribution R(OL) and is illustrated in FIG. 7.

This contribution varies smoothly with the overlap OL and can therefore be better at indicating whether a certain compression point is beneficial. By varying the steepness parameter b and the threshold (which in this example was 0.7) it is possible to reach any steepness and cutoff of the contribution R.

A further way to refine the results is to penalize $P(C_n)$ if there are bounding boxes in $R(C_n)$ that are not present in AT. For example, in the first way of embodiments of inventive concepts, the number of correctly identified bounding boxes can be decreased for each bounding box that is in $R(C_n)$ but not in AT.

Note that the machine learning method in the device 210 does not need to be the same as the one in the encoder 200. As an example, the machine learning method in the encoder 200 can try to recognize pedestrians, whereas the real method used in the device 210 on the receiving side may be trying to recognize cars. However, in general, if the video quality is good enough to recognize pedestrians, it will also be good enough to recognize cars.

Figure 8:
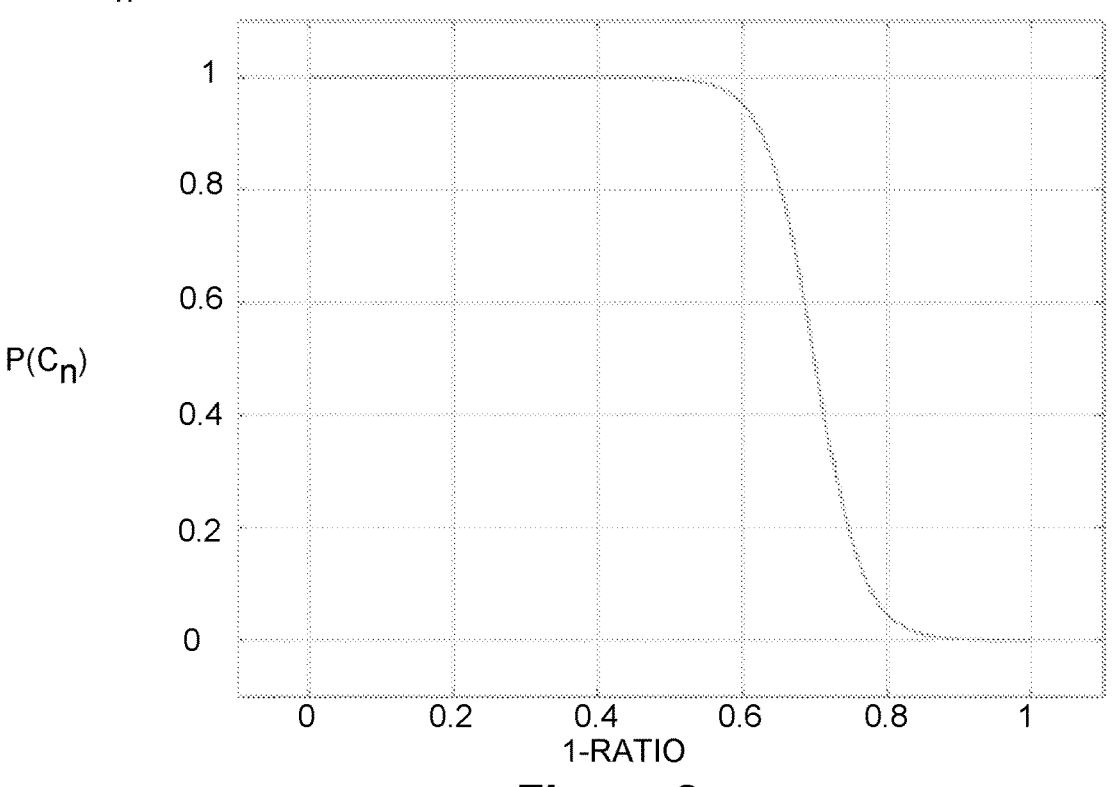
FIG. 8 is an illustration of a value indicating the performance of a compression algorithm plotted as a function of a ratio of correctly classified pixels according to some embodiments of inventive concepts.

In yet other embodiments of inventive concepts, an object recognition method is not used in the encoder 200 to calculate $P(C_n)$. Instead, a segmentation method can be used that segments every pixel in the image into ground, sky, building, car, pedestrian, bicycle etc. In a similar manner, an assumed truth is obtained by segmenting the uncompressed original (or the original after lightly compressing and decompressing the original). Then the segmentation is also done on a compressed representation. By comparing the classification of each pixel in the compressed representation with the one from the assumed truth, it is possible to use for instance $P(C_n)$=ratio, where ratio=(number_of_pixels_in_image−number_of_correctly_classified_pixels)/number_of_pixels_in_image and thus indicates how many pixels are misclassified. Likewise (1-ratio) gives the proportion of pixels correctly classified. Since it is likely not very useful if too low a number of pixels get correctly classified, it is possible to set a threshold of TH=0.7 and use $P(C_n)$=S(−b*((1−ratio)−TH)). FIG. 8 illustrates an example where TH=0.7 and b=30. The penalty $P(C_n)$ is high until around 70% correctly classified pixels and then goes down quickly for higher rates of correctly classified pixels.

Step 4: The score $P(C_n)$ and the bit cost $B(C_n)$ are passed into a rate-distortion optimization function, for example $$O(C_n)=B(C_n)*\lambda+P(C_n)$$

Any of the other rate-distortion optimization functions described above may be used.

A RD performance value $O(C_n)$ is calculated for each compression point $C_n$. The compression point to be used can be determined by taking $C_n$ where $O(C_n)$ is the lowest value of all $O(C_n)$ FIG. 9 is a block diagram illustrating elements of encoder 200 configured to encode video frames according to some embodiments of inventive concepts. As shown, encoder 200 may include a network interface circuit 905 (also referred to as a network interface) configured to provide communications with other devices/entities/functions/etc. The encoder 200 may also include a processor circuit 901 (also referred to as a processor) coupled to the network interface circuit 905, and a memory circuit 903 (also referred to as memory) coupled to the processor circuit. The memory circuit 903 may include computer readable program code that when executed by the processor circuit 901 causes the processor circuit to perform operations according to embodiments disclosed herein. According to other embodiments, processor circuit 901 may be defined to include memory so that a separate memory circuit is not required. As discussed herein, operations of the encoder 200 may be performed by processor 901 and/or network interface 905. For example, processor 901 may control network interface 905 to transmit communications to device 210 and/or to receive communications through network interface 905 from one or more other network nodes/entities/servers such as other encoder nodes, depository servers, etc. Moreover, modules may be stored in memory 903, and these modules may provide instructions so that when instructions of a module are executed by processor 901, processor 901 performs respective operations. According to some embodiments, an encoder 200 and/or an element(s)/function(s) thereof may be embodied as a virtual node/nodes/entity 200₁ and/or a virtual machine/machines.

FIG. 10 is a block diagram illustrating elements of a device 210 (also referred to as an apparatus, a mobile terminal, a mobile communication terminal, a wireless device, a wireless communication device, a wireless terminal, mobile device, a wireless communication terminal, user equipment, UE, a user equipment node/terminal/device, etc.) having a decoder 206 configured to decode and compress/decompress images or videos according to some embodiments of inventive concepts as described above. The device 210 also executes a machine vision task 212 to perform the machine vision tasks described herein. In some embodiments, the decoder 206 and machine vision task 212 may be integrated such that the machine vision task 212 can decode, compress, and decompress images or videos. As shown, device 210 may include a network interface circuit 1005 (also referred to as a network interface) configured to provide communications with other devices/entities/functions/etc. The device 210 may also include a processor circuit 1001 (also referred to as a processor) coupled to the network interface circuit 505, and a memory circuit 503 (also referred to as memory) coupled to the processor circuit. The memory circuit 503 may include computer readable program code that when executed by the processor circuit 501 causes the processor circuit to perform operations according to embodiments disclosed herein.

According to other embodiments, processor circuit 501 may be defined to include memory so that a separate memory circuit is not required. As discussed herein, operations of the device 210 may be performed by processor 1001 and/or network interface 1005. For example, processor 1001 may control network interface 1005 to receive communications from encoder 200. Moreover, modules may be stored in memory 1003, and these modules may provide instructions so that when instructions of a module are executed by processor 1001, processor 1001 performs respective operations and/or causes the device 210 or other nodes/functions to perform respective operations. According to some embodiments, a device 210 and/or an element(s)/function(s) thereof may be embodied as a virtual node/nodes and/or a virtual machine/machines.

In the description that follows, while the apparatus may be any of the encoder 200, device 210, wireless device 1710, the UE 4200, UEs 4491, 4492, virtual hardware 1830, virtual machine 1840, UE 4530, the network node 1760, base stations 4172, the host computer 4180, or the base station 4520, the encoder 200/device 210 shall be used to describe the functionality of the operations to determine compression parameters to choose when compressing images or videos for use in a machine vision task. Operations of the encoder 200/device 210 (implemented using the structure of the block diagrams of FIGS. 9 and 10) will now be discussed with reference to the flow chart of FIG. 11 according to some embodiments of inventive concepts. For example, modules may be stored in memory 905 of FIG. 9 and memory 1005 of FIG. 10, and these modules may provide instructions so that when the instructions of a module are executed by respective encoder 200/device 210 processing circuitry 901/1001, processing circuitry 901/ 1001 performs respective operations of the flow chart.

Turning to FIG. 11, in block 1101, the processing circuitry 901/1001 generates an assumed truth. In some embodiments of inventive concepts, the processing circuitry 901/1001 generates the assumed truth by executing the machine vision algorithm on the uncompressed original image or video to generate the assumed truth. In other embodiments of inventive concepts, the processing circuitry 901/1001 generates the assumed truth by executing the machine vision algorithm on a compressed and decompressed version of the uncompressed original image or video to generate the assumed truth.

In block 1103, the processing circuitry 901/1001 compresses an uncompressed original image or video at a plurality of different quality levels and/or bit rates to create a plurality of compressed images or videos.

In some embodiments of inventive concepts, the processing circuitry 901/1001 compresses the uncompressed original image or video at the plurality of different quality levels and/or bit rates by changing a resolution of the uncompressed original image or video to form a plurality of uncompressed original image or video, each having a resolution. Changing the resolution can include changing a spatial resolution and/or a temporal resolution.

In other embodiments of inventive concepts, the processing circuitry 901/1001 compresses the uncompressed original image or video at the plurality of different quality levels and/or bit rates by compressing the uncompressed original image or video using a different quantization parameter as the different quality levels.

In further embodiments of inventive concepts, the processing circuitry 901/1001 compresses the uncompressed original image or video at the plurality of different quality levels and/or bit rates by compressing the uncompressed original image or video using different quantization parameters for different parts of the uncompressed original image or video.

In yet other embodiments of inventive concepts, the processing circuitry 901/1001 compresses the uncompressed original image or video at the plurality of different quality levels and/or bit rates by compressing the uncompressed original image or video using different compression algorithms In additional embodiments of inventive concepts, the processing circuitry 901/1001 compresses the uncompressed original image or video at the plurality of different quality levels and/or bit rates by a combination of any of the above.

In block 1105, for each compressed image or video compressed at the different quality levels and/or bit rates, the processing circuitry 901/1101 executes blocks 1107-1111.

In block 1107, the processing circuitry 901/1101 decompresses the compressed image or video to create a decompressed image or video. In block 1109, the processing circuitry 901/1101 executes a machine vision algorithm on the decompressed image or video to generate machine vision results for the decompressed image or video. In block 1109, the processing circuitry 901/1101 derives a performance value indicating a performance of the decompressed image or video based on comparing the machine vision results to an assumed truth.

The processing circuitry 901/1101, in some embodiments, after block 1109, checks in block 1105 whether there are further compressed images or videos to process. If there are further compressed images or videos to process, the processing circuitry 901/1101 performs the operations described above in blocks 1107-1111.

If there are no further compressed images or videos to process, the processing circuitry 901/1101 in block 1113 determines a quality level and/or bit rate to use in the machine vision task based on the performance value for each decompressed image or video compressed at the different quality levels and/or bit rates.

Various operations from the flow chart of FIG. 11 may be optional with respect to some embodiments of communication devices and related methods. Regarding methods of example embodiment 1 (set forth below), for example, operations of block 1101 of FIG. 11 may be optional.

Turning to FIG. 12, in block 1201, the processing circuitry 901/1101 determines the bit rate to use based on bits spent on compressing the image or video.

In some embodiments of inventive concepts, a rate-distortion function can be used to set a rate distortion function. FIG. 13 illustrates various embodiments of inventive concepts of using a rate-distortion function.

Turning to FIG. 13, in block 1301, the processing circuitry 901/1101 executes a rate-distortion function to set a rate-distortion performance value of a compression-distortion tradeoff. In block 1303, the processing circuitry 901/ 1101 in determining the quality level and/or bit rate to use in the machine vision task, determines the quality level and/or bit rate to use in the machine vision task based further on the rate-distortion performance value.

In some embodiments of inventive concepts, the processing circuitry 901/1101 executes the rate-distortion function in accordance with:

$$O(C_n)=B(C_n)^i*\lambda+P(C_n)^j$$

where $O(C_n)$ is the rate-distortion value, $B(C_n)$ is the bit rate, $P(C_n)$ is the performance value, $\lambda$ is a weighting parameter and "i" and "j" are parameters.

In some embodiments of inventive concepts, the machine vision task is object detection and the machine vision results are a list of bounding boxes that describe each object. FIGS. 14-16 illustrate various embodiments of inventive concepts of deriving the performance value.

Turning to FIG. 14, in block 1401, the processing circuitry 901/1101 compares each bounding box in the machine vision results to bounding boxes in the assumed truth. In block 1403, the processing circuitry 901/1101, responsive to there being an amount of overlap between a bounding box in the machine vision results and a bounding box in the assumed truth being above a designated value, increases a number of correctly identified bounding boxes.

In block 1405, the processing circuitry 901/1101, responsive to all bounding boxes in the machine vision results being compared, derives the performance value. In some embodiments of inventive concepts, the processing circuitry 901/1101 derives the performance value by calculating the performance value by subtracting the number of correctly identified bounding boxes from a number of bounding boxes in the assumed truth. In other embodiments of inventive concepts, the processing circuitry 901/1101 derives the performance value by calculating the performance value by dividing the number of correctly identified bounding boxes by a number of bounding boxes in the assumed truth. These embodiments have been described above in further detail.

Turning to FIG. 15, in block 1501, the processing circuitry 901/1101 compares each bounding box in the machine vision results to bounding boxes in the assumed truth. In block 1503, the processing circuitry 901/1101, responsive to there being an amount of overlap between a bounding box in the machine vision results and a bounding box in the assumed truth being above a threshold, increases an overlap counter by a contribution that is calculated as an actual overlap of the bounding box in the machine vision results and a corresponding bounding box in the assumed truth.

In block 1505, the processing circuitry 901/1101, responsive to all bounding boxes in the machine vision results being compared, derives the performance value. In some embodiments of inventive concepts, the processing circuitry 901/1101 derives the performance value by calculating the performance value by subtracting the overlap counter from a number of bounding boxes in the assumed truth. In other embodiments of inventive concepts, the processing circuitry 901/1101 derives the performance value by calculating the performance value by dividing the overlap counter by a number of bounding boxes in the assumed truth. These embodiments have been described above in further detail.

Turning to FIG. 16, in block 1601, the processing circuitry 901/1101 compares each bounding box in the machine vision results to bounding boxes in the assumed truth. In block 1603, the processing circuitry 901/1101, responsive to there being an amount of overlap between a bounding box in the machine vision results and a bounding box in the assumed truth being above a threshold, increases an overlap counter by a contribution that is calculated as an actual overlap of the bounding box in the machine vision results and a corresponding bounding box in the assumed truth multiplied by a smoothing factor. In some embodiments of inventive concepts, the smoothing factor is a sigmoid function.

In block 1605, the processing circuitry 901/1101, responsive to all bounding boxes in the machine vision results being compared, derives the performance value. In some embodiments of inventive concepts, the processing circuitry 901/1101 derives the performance value by calculating the performance value by subtracting the overlap counter from a number of bounding boxes in the assumed truth. In other embodiments of inventive concepts, the processing circuitry 901/1101 derives the performance value by calculating the performance value by dividing the overlap counter by a number of bounding boxes in the assumed truth. These embodiments have been described above in further detail.

Explanations are provided below for various abbreviations/acronyms used in the present disclosure.

| Abbreviation | Explanation |
|---|---|
| AT | Assumed Truth |
| GT | Ground Truth |
| MV | Machine Vision |

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

As used herein, a network element, node or subsystem may be comprised of one or more pieces of service network equipment, including hardware and software that communicatively interconnects other equipment on a network (e.g., other network elements, end stations, etc.), and is adapted to host one or more applications or services, either in a virtualized/non-virtualized environment, with respect to a plurality of subscribers and associated user equipment (UE) nodes that are operative to receive/consume content in a media distribution network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., 360° immersive A/V media preparation delivery policy management, session control, QoS policy enforcement, bandwidth scheduling management, content provider priority policy management, streaming policy management, and the like), in addition to providing support for multiple application services (e.g., data and multimedia applications including 360° immersive video assets (also referred to as 360-degree video assets or simply 360 video assets) in varying qualities or definitions). Example subscriber end stations or client devices may comprise various devices, tethered or untethered, that may consume or deliver media content assets using streaming and/or file-based downloading technologies, which may involve some type of rate adaptation in certain embodiments. Illustrative client devices or UE devices may therefore include any device configured to execute, inter alia, one or more client applications for receiving, recording, storing, and/or decoding/rendering 360 video content, live media and/or static/on-demand media, which may comprise Virtual Reality (VR) media, Augmented Reality (AR) media, Mixed Reality (MR) media, from one or more content providers, e.g., via a broadband access network, using HTTP, HTTPS, RTP, and the like. Accordingly, such client devices may include Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) operating in concert with 3D display devices and the like, which may access or consume 360-degree content/services provided via a suitable media distribution network wherein a bandwidth and Quality of Experience (QoE) scheme may be provided in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Skilled artisans will recognize that the foregoing generalized example network environment may be implemented in a hierarchical network architecture, with various aspects of media capture and preparation, including, e.g., source stream stitching, projection mapping, source media compression, tiled/ABR encoding/transcoding, packaging, etc., as well as distributing/uploading and edge node processes taking place in different network portions disposed at different hierarchical levels, involving one or more operators, content delivery networks (CDNs), edge networks, and the like. Further, in some implementations, at least some of the foregoing apparatuses and processes may be cloud-based. In some arrangements, a CDN can be a large distributed system of servers deployed in multiple data centers connected to the Internet or other public/private communications network. A CDN can be a managed or unmanaged network, and can also be a federation of managed or unmanaged networks.

An example embodiment of a media server/source system operatively associated within the foregoing example network environment may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 17:
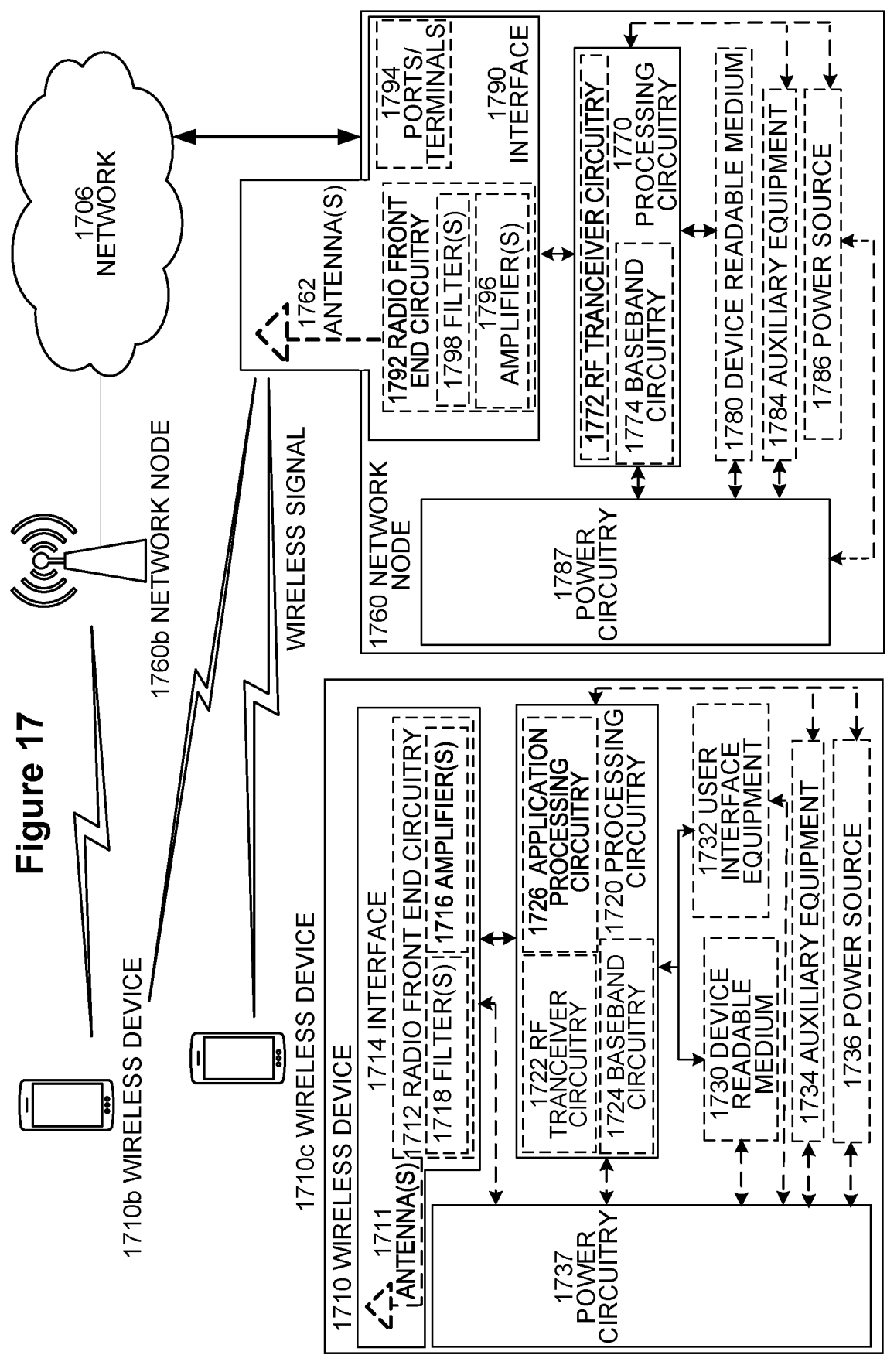
FIG. 17 is a block diagram of a wireless network in accordance with some embodiments.

FIG. 17 illustrates a wireless network in accordance with some embodiments where the encoder and device having the decoder and machine vision task(s) can be utilized.

Although the subject matter described herein may be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760b, and WDs 1710, 1710b, and 1710c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1760 are depicted as single boxes located within a larger box, or nested within multiple boxes, in practice, a network node may comprise multiple different physical components that make up a single illustrated component (e.g., device readable medium 1780 may comprise multiple separate hard drives as well as multiple RAM modules).

Similarly, network node 1760 may be composed of multiple physically separate components (e.g., a NodeB component and a RNC component, or a BTS component and a BSC component, etc.), which may each have their own respective components. In certain scenarios in which network node 1760 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1760 may be configured to support multiple radio access technologies (RATs). In such embodiments, some components may be duplicated (e.g., separate device readable medium 1780 for the different RATs) and some components may be reused (e.g., the same antenna 1762 may be shared by the RATs). Network node 1760 may also include multiple sets of the various illustrated components for different wireless technologies integrated into network node 1760, such as, for example, GSM, WCDMA, LTE, NR, WiFi, or Bluetooth wireless technologies. These wireless technologies may be integrated into the same or different chip or set of chips and other components within network node 1760.

Processing circuitry 1770 is configured to perform any determining, calculating, or similar operations (e.g., certain obtaining operations) described herein as being provided by a network node. These operations performed by processing circuitry 1770 may include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1760 components, such as device readable medium 1780, network node 1760 functionality. For example, processing circuitry 1770 may execute instructions stored in device readable medium 1780 or in memory within processing circuitry 1770. Such functionality may include providing any of the various wireless features, functions, or benefits discussed herein. In some embodiments, processing circuitry 1770 may include a system on a chip (SOC).

In some embodiments, processing circuitry 1770 may include one or more of radio frequency (RF) transceiver circuitry 1772 and baseband processing circuitry 1774. In some embodiments, radio frequency (RF) transceiver circuitry 1772 and baseband processing circuitry 1774 may be on separate chips (or sets of chips), boards, or units, such as radio units and digital units. In alternative embodiments, part or all of RF transceiver circuitry 1772 and baseband processing circuitry 1774 may be on the same chip or set of chips, boards, or units In certain embodiments, some or all of the functionality described herein as being provided by a network node, base station, eNB or other such network device may be performed by processing circuitry 1770 executing instructions stored on device readable medium 1780 or memory within processing circuitry 1770. In alternative embodiments, some or all of the functionalities may be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760, but are enjoyed by network node 1760 as a whole, and/or by end users and the wireless network generally.

Device readable medium 1780 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1770. Device readable medium 1780 may store any suitable instructions, data or information, including a computer program, software, an application including one or more of logic, rules, code, tables, etc. and/or other instructions capable of being executed by processing circuitry 1770 and, utilized by network node 1760. Device readable medium 1780 may be used to store any calculations made by processing circuitry 1770 and/or any data received via interface 1790. In some embodiments, processing circuitry 1770 and device readable medium 1780 may be considered to be integrated.

Interface 1790 is used in the wired or wireless communication of signalling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that may be coupled to, or in certain embodiments a part of, antenna 1762. Radio front end circuitry 1792 comprises filters 1798 and amplifiers 1796. Radio front end circuitry 1792 may be connected to antenna 1762 and processing circuitry 1770. Radio front end circuitry may be configured to condition signals communicated between antenna 1762 and processing circuitry 1770. Radio front end circuitry 1792 may receive digital data that is to be sent out to other network nodes or WDs via a wireless connection. Radio front end circuitry 1792 may convert the digital data into a radio signal having the appropriate channel and bandwidth parameters using a combination of filters 1798 and/or amplifiers 1796. The radio signal may then be transmitted via antenna 1762. Similarly, when receiving data, antenna 1762 may collect radio signals which are then converted into digital data by radio front end circuitry 1792. The digital data may be passed to processing circuitry 1770. In other embodiments, the interface may comprise different components and/or different combinations of components.

In certain alternative embodiments, network node 1760 may not include separate radio front end circuitry 1792, instead, processing circuitry 1770 may comprise radio front end circuitry and may be connected to antenna 1762 without separate radio front end circuitry 1792. Similarly, in some embodiments, all or some of RF transceiver circuitry 1772 may be considered a part of interface 1790. In still other embodiments, interface 1790 may include one or more ports or terminals 1794, radio front end circuitry 1792, and RF transceiver circuitry 1772, as part of a radio unit (not shown), and interface 1790 may communicate with baseband processing circuitry 1774, which is part of a digital unit (not shown).

Antenna 1762 may include one or more antennas, or antenna arrays, configured to send and/or receive wireless signals. Antenna 1762 may be coupled to radio front end circuitry 1792 and may be any type of antenna capable of transmitting and receiving data and/or signals wirelessly. In some embodiments, antenna 1762 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1762 may be separate from network node 1760 and may be connectable to network node 1760 through an interface or port.

Antenna 1762, interface 1790, and/or processing circuitry 1770 may be configured to perform any receiving operations and/or certain obtaining operations described herein as being performed by a network node. Any information, data and/or signals may be received from a wireless device, another network node and/or any other network equipment. Similarly, antenna 1762, interface 1790, and/or processing circuitry 1770 may be configured to perform any transmitting operations described herein as being performed by a network node. Any information, data and/or signals may be transmitted to a wireless device, another network node and/or any other network equipment.

Power circuitry 1787 may comprise, or be coupled to, power management circuitry and is configured to supply the components of network node 1760 with power for performing the functionality described herein. Power circuitry 1787 may receive power from power source 1786. Power source 1786 and/or power circuitry 1787 may be configured to provide power to the various components of network node 1760 in a form suitable for the respective components (e.g., at a voltage and current level needed for each respective component). Power source 1786 may either be included in, or external to, power circuitry 1787 and/or network node 1760. For example, network node 1760 may be connectable to an external power source (e.g., an electricity outlet) via an input circuitry or interface such as an electrical cable, whereby the external power source supplies power to power circuitry 1787. As a further example, power source 1786 may comprise a source of power in the form of a battery or battery pack which is connected to, or integrated in, power circuitry 1787. The battery may provide backup power should the external power source fail. Other types of power sources, such as photovoltaic devices, may also be used.

Alternative embodiments of network node 1760 may include additional components beyond those shown in FIG. 17 that may be responsible for providing certain aspects of the network node's functionality, including any of the functionality described herein and/or any functionality necessary to support the subject matter described herein. For example, network node 1760 may include user interface equipment to allow input of information into network node 1760 and to allow output of information from network node 1760. This may allow a user to perform diagnostic, maintenance, repair, and other administrative functions for network node 1760.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 may include multiple sets of one or more of the illustrated components for different wireless technologies supported by WD 1710, such as, for example, GSM, WCDMA, LTE, NR, WiFi, WiMAX, or Bluetooth wireless technologies, just to mention a few. These wireless technologies may be integrated into the same or different chips or set of chips as other components within WD 1710.

Antenna 1711 may include one or more antennas or antenna arrays, configured to send and/or receive wireless signals, and is connected to interface 1714. In certain alternative embodiments, antenna 1711 may be separate from WD 1710 and be connectable to WD 1710 through an interface or port. Antenna 1711, interface 1714, and/or processing circuitry 1720 may be configured to perform any receiving or transmitting operations described herein as being performed by a WD. Any information, data and/or signals may be received from a network node and/or another WD. In some embodiments, radio front end circuitry and/or antenna 1711 may be considered an interface.

As illustrated, interface 1714 comprises radio front end circuitry 1712 and antenna 1711. Radio front end circuitry 1712 comprise one or more filters 1718 and amplifiers 1716. Radio front end circuitry 1712 is connected to antenna 1711 and processing circuitry 1720, and is configured to condition signals communicated between antenna 1711 and processing circuitry 1720. Radio front end circuitry 1712 may be coupled to or a part of antenna 1711. In some embodiments, WD 1710 may not include separate radio front end circuitry 1712; rather, processing circuitry 1720 may comprise radio front end circuitry and may be connected to antenna 1711. Similarly, in some embodiments, some or all of RF transceiver circuitry 1722 may be considered a part of interface 1714. Radio front end circuitry 1712 may receive digital data that is to be sent out to other network nodes or WDs via a wireless connection. Radio front end circuitry 1712 may convert the digital data into a radio signal having the appropriate channel and bandwidth parameters using a combination of filters 1718 and/or amplifiers 1716. The radio signal may then be transmitted via antenna 1711. Similarly, when receiving data, antenna 1711 may collect radio signals which are then converted into digital data by radio front end circuitry 1712. The digital data may be passed to processing circuitry 1720. In other embodiments, the interface may comprise different components and/or different combinations of components.

Processing circuitry 1720 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1710 components, such as device readable medium 1730, WD 1710 functionality. Such functionality may include providing any of the various wireless features or benefits discussed herein. For example, processing circuitry 1720 may execute instructions stored in device readable medium 1730 or in memory within processing circuitry 1720 to provide the functionality disclosed herein.

As illustrated, processing circuitry 1720 includes one or more of RF transceiver circuitry 1722, baseband processing circuitry 1724, and application processing circuitry 1726. In other embodiments, the processing circuitry may comprise different components and/or different combinations of components. In certain embodiments processing circuitry 1720 of WD 1710 may comprise a SOC. In some embodiments, RF transceiver circuitry 1722, baseband processing circuitry 1724, and application processing circuitry 1726 may be on separate chips or sets of chips. In alternative embodiments, part or all of baseband processing circuitry 1724 and application processing circuitry 1726 may be combined into one chip or set of chips, and RF transceiver circuitry 1722 may be on a separate chip or set of chips. In still alternative embodiments, part or all of RF transceiver circuitry 1722 and baseband processing circuitry 1724 may be on the same chip or set of chips, and application processing circuitry 1726 may be on a separate chip or set of chips. In yet other alternative embodiments, part or all of RF transceiver circuitry 1722, baseband processing circuitry 1724, and application processing circuitry 1726 may be combined in the same chip or set of chips. In some embodiments, RF transceiver circuitry 1722 may be a part of interface 1714. RF transceiver circuitry 1722 may condition RF signals for processing circuitry 1720.

In certain embodiments, some or all of the functionality described herein as being performed by a WD may be provided by processing circuitry 1720 executing instructions stored on device readable medium 1730, which in certain embodiments may be a computer-readable storage medium. In alternative embodiments, some or all of the functionality may be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 may be configured to perform any determining, calculating, or similar operations (e.g., certain obtaining operations) described herein as being performed by a WD. These operations, as performed by processing circuitry 1720, may include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 may be operable to store a computer program, software, an application including one or more of logic, rules, code, tables, etc. and/or other instructions capable of being executed by processing circuitry 1720. Device readable medium 1730 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1720. In some embodiments, processing circuitry 1720 and device readable medium 1730 may be considered to be integrated.

User interface equipment 1732 may provide components that allow for a human user to interact with WD 1710. Such interaction may be of many forms, such as visual, audial, tactile, etc. User interface equipment 1732 may be operable to produce output to the user and to allow the user to provide input to WD 1710. The type of interaction may vary depending on the type of user interface equipment 1732 installed in WD 1710. For example, if WD 1710 is a smart phone, the interaction may be via a touch screen; if WD 1710 is a smart meter, the interaction may be through a screen that provides usage (e.g., the number of gallons used) or a speaker that provides an audible alert (e.g., if smoke is detected). User interface equipment 1732 may include input interfaces, devices and circuits, and output interfaces, devices and circuits. User interface equipment 1732 is configured to allow input of information into WD 1710, and is connected to processing circuitry 1720 to allow processing circuitry 1720 to process the input information. User interface equipment 1732 may include, for example, a microphone, a proximity or other sensor, keys/buttons, a touch display, one or more cameras, a USB port, or other input circuitry. User interface equipment 1732 is also configured to allow output of information from WD 1710, and to allow processing circuitry 1720 to output information from WD 1710. User interface equipment 1732 may include, for example, a speaker, a display, vibrating circuitry, a USB port, a headphone interface, or other output circuitry. Using one or more input and output interfaces, devices, and circuits, of user interface equipment 1732, WD 1710 may communicate with end users and/or the wireless network, and allow them to benefit from the functionality described herein.

Auxiliary equipment 1734 is operable to provide more specific functionality which may not be generally performed by WDs. This may comprise specialized sensors for doing measurements for various purposes, interfaces for additional types of communication such as wired communications etc. The inclusion and type of components of auxiliary equipment 1734 may vary depending on the embodiment and/or scenario.

Power source 1736 may, in some embodiments, be in the form of a battery or battery pack. Other types of power sources, such as an external power source (e.g., an electricity outlet), photovoltaic devices or power cells, may also be used. WD 1710 may further comprise power circuitry 1737 for delivering power from power source 1736 to the various parts of WD 1710 which need power from power source 1736 to carry out any functionality described or indicated herein. Power circuitry 1737 may in certain embodiments comprise power management circuitry. Power circuitry 1737 may additionally or alternatively be operable to receive power from an external power source; in which case WD 1710 may be connectable to the external power source (such as an electricity outlet) via input circuitry or an interface such as an electrical power cable. Power circuitry 1737 may also in certain embodiments be operable to deliver power from an external power source to power source 1736. This may be, for example, for the charging of power source 1736. Power circuitry 1737 may perform any formatting, converting, or other modification to the power from power source 1736 to make the power suitable for the respective components of WD 1710 to which power is supplied.

Figure 18:
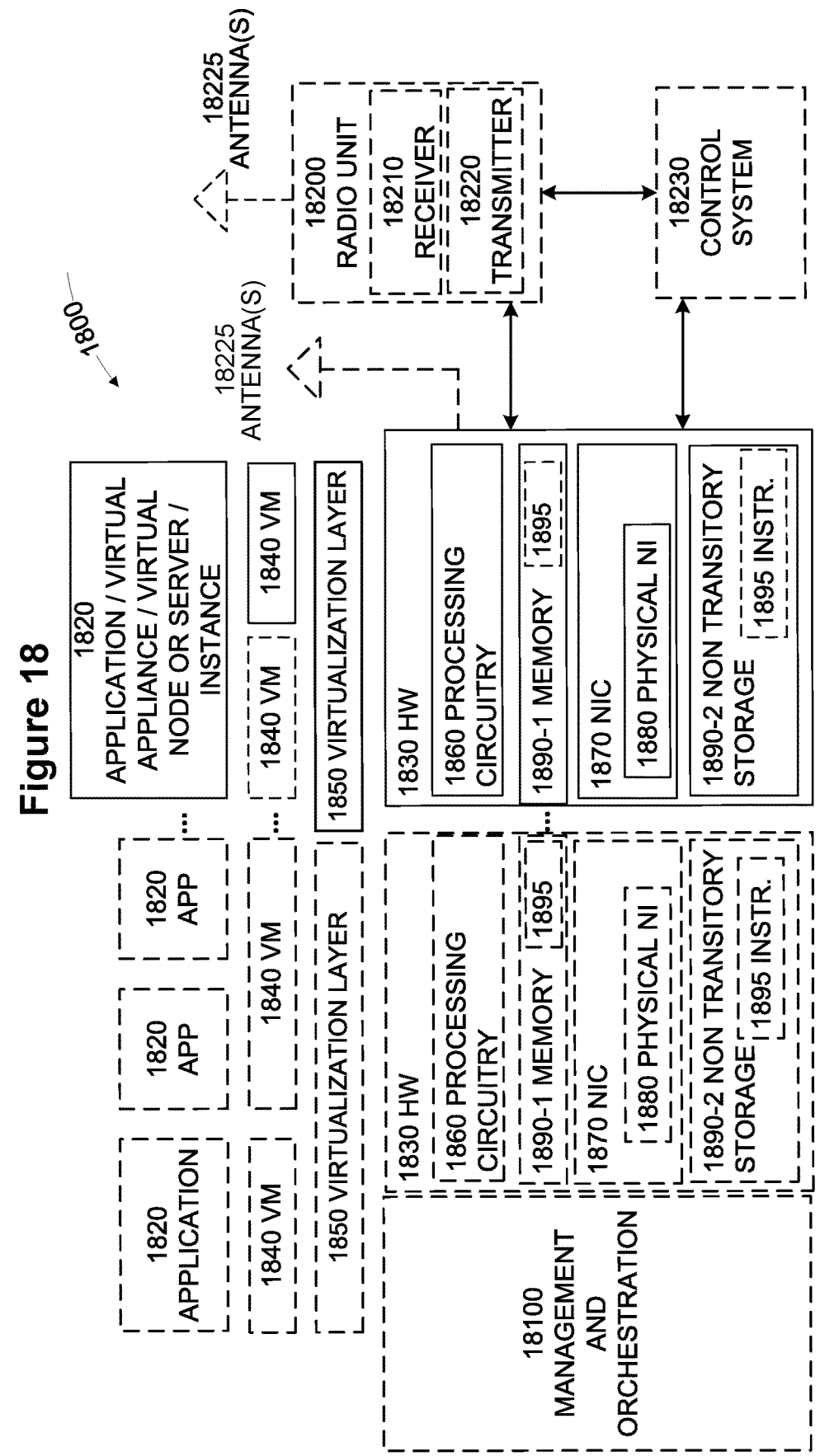
FIG. 18 is a block diagram of a virtualization environment in accordance with some embodiments.

FIG. 18 illustrates a virtualization environment in accordance with some embodiments where the encoder and the device having the decoder and the machine vision task(s) can be virtualized.

FIG. 18 is a schematic block diagram illustrating a virtualization environment 1800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., an encoder, a device having a decoder and a machine vision task(s), a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1800 hosted by one or more of hardware nodes 1830. Further, in embodiments in which the virtual node is not a radio access node or does not require radio connectivity (e.g., a core network node), then the network node may be entirely virtualized.

The functions may be implemented by one or more applications 1820 (which may alternatively be called software instances, virtual appliances, network functions, virtual nodes, virtual network functions, etc.) operative to implement some of the features, functions, and/or benefits of some of the embodiments disclosed herein. Applications 1820 are run in virtualization environment 1800 which provides hardware 1830 comprising processing circuitry 1860 and memory 1890. Memory 1890 contains instructions 1895 executable by processing circuitry 1860 whereby application 1820 is operative to provide one or more of the features, benefits, and/or functions disclosed herein.

Virtualization environment 1800, comprises general-purpose or special-purpose network hardware devices 1830 comprising a set of one or more processors or processing circuitry 1860, which may be commercial off-the-shelf (COTS) processors, dedicated Application Specific Integrated Circuits (ASICs), or any other type of processing circuitry including digital or analog hardware components or special purpose processors. Each hardware device may comprise memory 1890-1 which may be non-persistent memory for temporarily storing instructions 1895 or software executed by processing circuitry 1860. Each hardware device may comprise one or more network interface controllers (NICs) 1870, also known as network interface cards, which include physical network interface 1880. Each hardware device may also include non-transitory, persistent, machine-readable storage media 1890-2 having stored therein software 1895 and/or instructions executable by processing circuitry 1860. Software 1895 may include any type of software including software for instantiating one or more virtualization layers 1850 (also referred to as hypervisors), software to execute virtual machines 1840 as well as software allowing it to execute functions, features and/or benefits described in relation with some embodiments described herein.

Virtual machines 1840 comprise virtual processing, virtual memory, virtual networking or interface and virtual storage, and may be run by a corresponding virtualization layer 1850 or hypervisor. Different embodiments of the instance of virtual appliance 1820 may be implemented on one or more of virtual machines 1840, and the implementations may be made in different ways.

During operation, processing circuitry 1860 executes software 1895 to instantiate the hypervisor or virtualization layer 1850, which may sometimes be referred to as a virtual machine monitor (VMM). Virtualization layer 1850 may present a virtual operating platform that appears like networking hardware to virtual machine 1840.

As shown in FIG. 18, hardware 1830 may be a standalone network node with generic or specific components. Hardware 1830 may comprise antenna 18225 and may implement some functions via virtualization. Alternatively, hardware 1830 may be part of a larger cluster of hardware (e.g. such as in a data center or customer premise equipment (CPE)) where many hardware nodes work together and are managed via management and orchestration (MANO) 18100, which, among others, oversees lifecycle management of applications 1820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1840 may be a software implementation of a physical machine that runs programs as if they were executing on a physical, non-virtualized machine. Each of virtual machines 1840, and that part of hardware 1830 that executes that virtual machine, be it hardware dedicated to that virtual machine and/or hardware shared by that virtual machine with others of the virtual machines 1840, forms a separate virtual network elements (VNE).

Still in the context of NFV, Virtual Network Function (VNF) is responsible for handling specific network functions that run in one or more virtual machines 1840 on top of hardware networking infrastructure 1830 and corresponds to application 1820 in FIG. 18.

In some embodiments, one or more radio units 18200 that each include one or more transmitters 18220 and one or more receivers 18210 may be coupled to one or more antennas 18225. Radio units 18200 may communicate directly with hardware nodes 1830 via one or more appropriate network interfaces and may be used in combination with the virtual components to provide a virtual node with radio capabilities, such as a radio access node or a base station.

In some embodiments, some signalling can be effected with the use of control system 18230 which may alternatively be used for communication between the hardware nodes 1830 and radio units 18200.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

REFERENCES

[1] MPEG Technical Requirements, "Call for Evidence for Video Coding for Machines," MPEG WG2-N00042, Online, January 2021

The invention claimed is:

1. A method performed by an apparatus to determine compression parameters to choose when compressing images or videos for use in a machine vision task, the method comprising:

compressing an uncompressed original image or video at a plurality of different quality levels and/or bit rates to create a plurality of compressed images or videos;

for each compressed image or video compressed at the different quality levels and/or bit rates:

decompressing the compressed image or video to create a decompressed image or video;

executing a machine vision algorithm on the decompressed image or video to generate machine vision results for the decompressed image or video;

generating an assumed truth derived from the original uncompressed image or video;

deriving a performance value indicating a performance of the decompressed image or video for the machine vision task based on comparing the machine vision results to the assumed truth derived from the original uncompressed image or video; and determining a quality level and/or bit rate to choose when compressing an image or video to use in the machine vision task based on the performance value for each decompressed image or video compressed at the different quality levels and/or bit rates; and wherein generating the assumed truth comprises executing the machine vision algorithm on the uncompressed original image or video to generate the assumed truth.

2. The method of claim 1, wherein generating the assumed truth comprises:

executing the machine vision algorithm on a compressed and decompressed version of the uncompressed original image or video to generate the assumed truth.

3. The method of claim 1, wherein compressing the uncompressed original image or video at the plurality of different quality levels and/or bit rates comprises:

changing a resolution of the uncompressed original image or video to form a plurality of uncompressed original image or video, each having a resolution.

4. The method of claim 3, wherein changing the resolution comprises changing a spatial resolution and/or a temporal resolution.

5. The method of claim 1, wherein compressing the uncompressed original image or video at the plurality of different quality levels and/or bit rates comprises:

compressing the uncompressed original image or video using a different quantization parameter as the different quality levels.

6. The method of claim 1, wherein compressing the uncompressed original image or video at the plurality of different quality levels and/or bit rates comprises:

compressing the uncompressed original image or video using different quantization parameters for different parts of the uncompressed original image or video.

7. The method of claim 1, wherein compressing the uncompressed original image or video at the plurality of different quality levels and/or bit rates comprises:

compressing the uncompressed original image or video using different compression algorithms.

8. The method of claim 1, further comprising determining the bit rate to use based on the number of bits needed to store or transmit the compressed image or video.

9. The method of claim 1, further comprising executing a rate-distortion function to set a rate-distortion performance value of a compression-distortion tradeoff and determining the quality level and/or bit rate to use in the machine vision task comprises determining the quality level and/or bit rate to use in the machine vision task based further on the rate-distortion performance value.

10. The method of claim 1, wherein the machine vision task is object detection and the machine vision results are a list of bounding boxes that describe each object and wherein deriving the performance value comprises:

comparing each bounding box in the machine vision results to bounding boxes in the assumed truth;

responsive to there being an amount of overlap between a bounding box in the machine vision results and a bounding box in the assumed truth being above a designated value, increasing a number of correctly identified bounding boxes;

responsive to all bounding boxes in the machine vision results being compared, deriving the performance value.

11. An apparatus adapted to perform according to claim 1.

12. A computer program product comprising a non-transitory storage medium including program code to be executed by processing circuitry of an apparatus, whereby execution of the program code causes the apparatus to perform according to claim 1.

* * * * *